(12) United States Patent
Fu et al.

(10) Patent No.: US 7,246,101 B2
(45) Date of Patent: Jul. 17, 2007

(54) KNOWLEDGE-BASED SYSTEM AND METHOD FOR RECONSTRUCTING CLIENT WEB PAGE ACCESSES FROM CAPTURED NETWORK PACKETS

(75) Inventors: Yun Fu, Durham, NC (US); Ludmila Cherkasova, Sunnyvale, CA (US); Wenting Tang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 938 days.

(21) Appl. No.: 10/147,619

(22) Filed: May 16, 2002

(65) Prior Publication Data

US 2003/0217144 A1 Nov. 20, 2003

(51) Int. Cl.
G06F 17/00 (2006.01)
G06F 7/00 (2006.01)
G06F 15/173 (2006.01)
G06N 5/02 (2006.01)

(52) U.S. Cl. ............... 706/46; 707/104.1; 709/224
(58) Field of Classification Search ............ 706/46, 706/45; 707/104.1; 709/224
See application file for complete search history.

(56) References Cited

U.S. PATENT DOCUMENTS

| | | | | |
|---|---|---|---|---|
| 6,377,944 B1 * | 4/2002 | Busey et al. | ................ | 707/3 |
| 6,535,913 B2 * | 3/2003 | Mittal et al. | ................ | 709/219 |
| 6,560,639 B1 * | 5/2003 | Dan et al. | ................ | 709/218 |
| 6,763,342 B1 * | 7/2004 | Mattern et al. | ................ | 706/46 |
| 6,871,284 B2 * | 3/2005 | Copper et al. | ................ | 713/200 |
| 2001/0027483 A1 * | 10/2001 | Gupta et al. | ................ | 709/219 |
| 2003/0217117 A1 * | 11/2003 | Dan et al. | ................ | 709/218 |

OTHER PUBLICATIONS

William James, "Web-Based Organization of Relevant Knowledge for Web-Oriented Instruction and Learning", IEEE Frontiers in Education Conference, 1997.*
"Candle Corporation eBusiness"; printed from Website http://www.candle.com—10 pages.
"Cisco DistributedDirector"; printed from Website http//www.cisco.com—20 pages.
Feldmann, Anja, "BLT: Bi-Layer Tracing of HTTP and TCP/IP", AT&T Labs—Research, Florham Park, NJ, —12 pages.
"IBM Corporation, Tivoli Web Management Solutions"; printed from Website http://www.tivoli.com—5 pages.
"JavaServlet Technology"; printed from Website http://java.sun.com—14 pages.
"Javaserver Pages White Paper"; printed from Website http://java.sun.com—8 pages.

(Continued)

Primary Examiner—Anthony Knight
Assistant Examiner—Michael B. Holmes
(74) Attorney, Agent, or Firm—Richard P. Lange

(57) ABSTRACT

According to one embodiment of the present invention, a method for reconstructing client web page accesses is provided that comprises capturing network-level information for client accesses of at least one web page. The method further comprises constructing a knowledge base of reliable information identifying content of at least one web page, and reconstructing at least one client web page access from the captured network-level information using the reliable information of the knowledge base.

34 Claims, 9 Drawing Sheets

OTHER PUBLICATIONS

"Keynote Systems, Inc."; printed from Website http://www.keynote.com—4 pages.

Krishnamurthy, Balachander, et al.; "Web Protocols and Practice: HTTP/1.1, Networking Protocols, Caching, and Traffic Measurement", pp. 511-522, Addison Wesley, 2001.

NetMechanic, Inc.; printed from Website http://www.netemechanics.com—2 pages.

Porivo Technologies, Inc.; printed from Website http://www.porivo.com—5 pages.

Rajamony, Ramakrishnan et al., Measuring Client-Perceived Response Times on the WWW; proceedings of the Third USENIX Symposium on Internet Technologies and Systems, Mar. 2001—12 pages.

Seshan, Srinivasan, et al., "SPAND: Shared Passive Network Performance Discovery"; USENIX Symposium on Internet Technologies and Systems, 1997, 6 pages.

Stemm, Mark, et al., "A Network Measurement Architecture for Adaptice Applications", USENIX Symposium on Internet Technologies and Systems, 1997—10 pages.

Software Research, Inc.; printed from Website http://www.soft.com—2 pages.

TCPDUMP, printed from Website http://www.tcpdump.org—3 pages.

Smith, F. Donelson, et al., "What TCP/IP Protocol Headers Can Tell Us About the Web", Proceedings of ACM Sigmetrics 2001/Performance 2001, Jun. 2001—12 pages.

RFC2616; printed from Internet RFC/STD/FYI/BCO Archives.

* cited by examiner

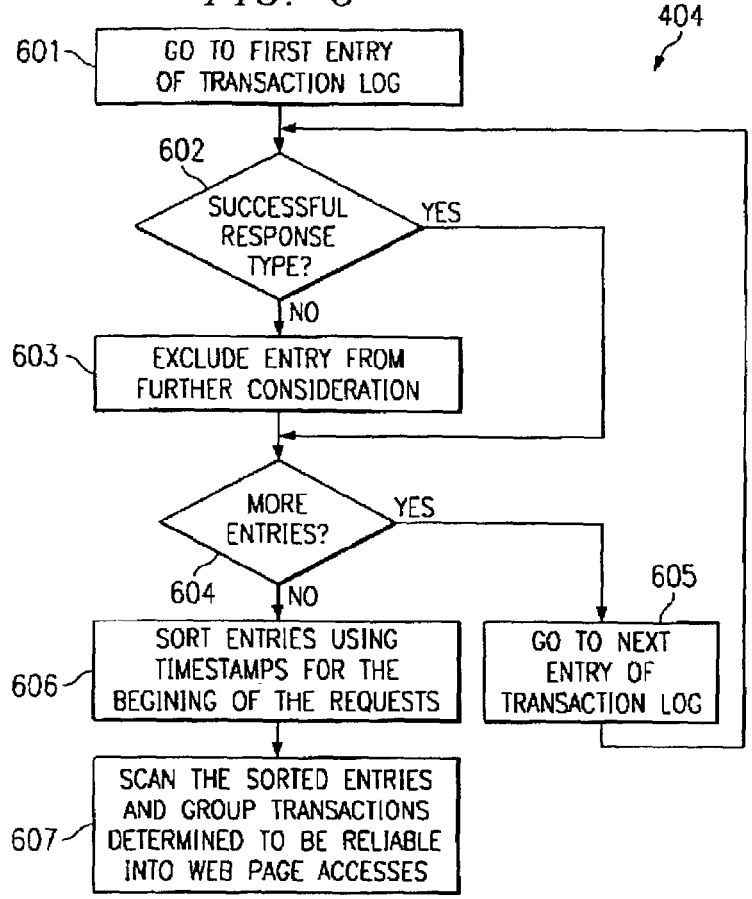
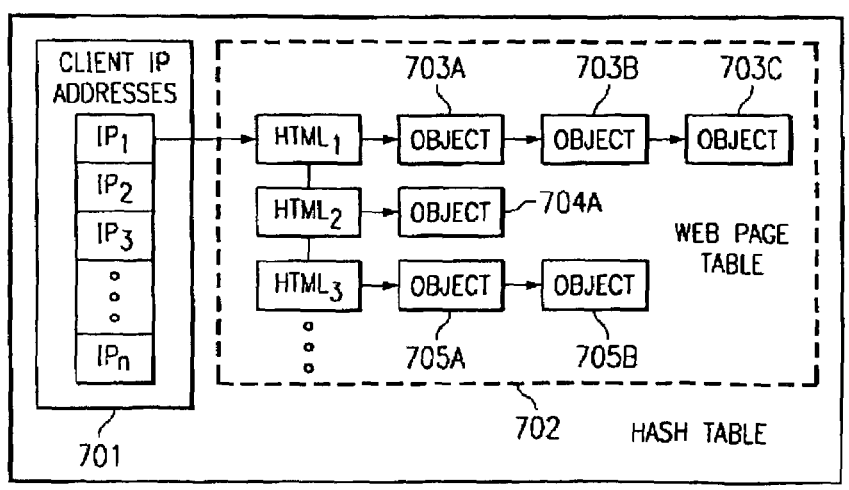

KNOWLEDGE-BASED SYSTEM AND METHOD FOR RECONSTRUCTING CLIENT WEB PAGE ACCESSES FROM CAPTURED NETWORK PACKETS

CROSS-REFERENCE TO RELATED APPLICATIONS

This application is related to U.S. Published Patent Application No. 2003/0217162 entitled "SYSTEM AND METHOD FOR RECONSTRUCTING CLIENT WEB PAGE ACCESSES FROM CAPTURED NETWORK PACKETS", U.S. Published Patent Application No. 2003/0217130 entitled "SYSTEM AND METHOD FOR COLLECTING DESIRED INFORMATION FOR NETWORK TRANSACTIONS AT THE KERNEL LEVEL", U.S. Published Patent Application No. 2005/0076111 entitled "SYSTEM AND METHOD FOR RELATING ABORTED CLIENT ACCESSES OF DATA TO QUALITY OF SERVICE PROVIDED BY A SERVER IN A CLIENT-SERVER NETWORK", and U.S. Published Patent Application No. 2003/022100 entitled "SYSTEM AND METHOD FOR MEASURING WEB SERVICE PERFORMANCE USING CAPTURED NETWORK PACKETS", the disclosures of which are hereby incorporated herein by reference.

FIELD OF THE INVENTION

The present invention relates in general to client-server networks, and more specifically to a system and method for reconstructing a client access of a web service from network packets captured on the server side of a client-server network.

BACKGROUND OF THE INVENTION

Today, Internet services are delivering a large array of business, government, and personal services. Similarly, mission critical operations, related to scientific instrumentation, military operations, and health services, are making increasing use of the Internet for delivering information and distributed coordination. For example, many users are accessing the Internet seeking such services as personal shopping, airline reservations, rental car reservations, hotel reservations, on-line auctions, on-line banking, stock market trading, as well as many other services being offered via the Internet. Many companies are providing such services via the Internet, and are therefore beginning to compete in this forum. Accordingly, it is important for such service providers (sometimes referred to as "content providers") to provide high-quality services.

One measure of the quality of service provided by service providers is the end-to-end performance characteristic. The end-to-end performance concern of service providers. In general, the end-to-end performance perceived by a client is a measurement of the time from when the client requests a service (e.g., a web page) from a service provider to the time when the client fully receives the requested service. For instance, if a client requests to access a service provided by a service provider, and it takes several minutes for the service to be downloaded from the service provider to the client, the client may consider the quality of the service as being poor because of its long download time. In fact, the client may be too impatient to wait for the service to fully load and may instead attempt to obtain the service from another provider. Currently, most website providers set a target client-perceived end-to-end time of less than six seconds for their web pages. That is, website providers typically like to provide their requested web pages to a client in less than six seconds from the time the client requests the page.

A popular client-server network is the Internet. The Internet is a packet-switched network, which means that when information is sent across the Internet from one computer to another, the data is broken into small packets. A series of switches called routers send each packet across the network individually. After all of the packets arrive at the receiving computer, they are recombined into their original, unified form. TCP/IP is a protocol commonly used for communicating the packets of data. In TCP/IP, two protocols do the work of breaking the data into packets, routing the packets across the Internet, and then recombining them on the other end: 1) the Internet Protocol (IP), which routes the data, and 2) the Transmission Control Protocol (TCP), which breaks the data into packets and recombines them on the computer that receives the information. TCP/IP is well known in the existing art, and therefore is not described in further detail herein.

One popular part of the Internet is the World Wide Web (which may be referred to herein simply as the "web"). Computers (or "servers") that provide information on the web are typically called "websites." Services offered by service providers' websites are obtained by clients via the web by downloading web pages from such websites to a browser executing on the client. For example, a user may use a computer (e.g., personal computer, laptop computer, workstation, personal digital assistant, cellular telephone, or other processor-based device capable of accessing the Internet) to access the Internet (e.g., via a conventional modem). A browser, such as NETSCAPE NAVIGATOR developed by NETSCAPE, INC. and MICROSOFT INTERNET EXPLORER developed by MICROSOFT CORPORATION, as examples, may be executing on the user's computer to enable a user to input information requesting to access a particular website and to output information (e.g., web pages) received from an accessed website.

In general, a web page is typically composed of a mark-up language file, such as a HyperText Mark-up Language (HTML), Extensible Mark-up Language (XML), Handheld Device Mark-up Language (HDML), or Wireless Mark-up Language (WML) file, and several embedded objects, such as images. A browser retrieves a web page by issuing a series of HyperText Transfer Protocol (HTTP) requests for all objects. As is well known, HTTP is the underlying protocol used by the World Wide Web. The HTTP requests can be sent through one persistent TCP connection or multiple concurrent connections.

As described above, service providers often desire to have an understanding of their end-to-end performance characteristics. Effectively monitoring and characterizing the end-to-end behavior of web transactions is important for evaluating and/or improving the web site performance and selecting the proper web site architecture for a service provider to implement. Because in this forum the client-perceived website responses are downloaded web pages, the performance related to web page downloading is one of the critical elements in evaluating end-to-end performance. However, the nature of the Internet and the manner in which services are provided via the web result in difficulty in acquiring meaningful performance measurements. For instance, the best effort nature of Internet data delivery, changing client and network connectivity characteristics, and the highly complex architectures of modern Internet services makes it very difficult to understand the performance characteristics of Internet services. In a competitive landscape, such understanding is critical to continually evolving and engineering Internet services to match changing demand levels and client populations.

Two popular techniques exist in the prior art for benchmarking the performance of Internet services: 1) the active probing technique, and 2) the web page instrumentation technique. The active probing technique uses machines from fixed points in the Internet to periodically request one or more Uniform Resource Locators (URLs) from a target web service, record end-to-end performance characteristics, and report a time-varying summary back to the web service. For example, in an active probing technique, artificial clients may be implemented at various fixed points (e.g., at fifty different points) within a network, and such artificial clients may periodically (e.g., once every hour or once every 15 minutes) request a particular web page from a website and measure the end-to-end performance for receiving the requested web page at the requesting artificial client. A number of companies use active probing techniques to offer measurement and testing services, including KEYNOTE SYSTEMS, INC. (see http://www.keynote.com), NETMECHANIC, INC. (see http://www.netmechanics.com), SOFTWARE RESEARCH INC. (see http://www.soft.com), and PORIVO TECHNOLOGIES, INC. (see http://www.porivo.com).

The active probing techniques are based on periodic polling of web services using a set of geographically distributed, synthetic clients. In general, only a few pages or operations can typically be tested, potentially reflecting only a fraction of all user's experience with the services of a given web service provider. Further, active probing techniques typically cannot capture the potential benefits of browser's and network caches, in some sense reflecting "worst case" performance. From another perspective, active probes comprise a different set of machines than those that actually access the service. For example, the artificial clients used for probing a website may comprise different hardware and/or different network connectivity than that of typical end users of the website. For instance, most users of a particular website may have a dial-up modem connection (e.g., using a 56 kilobyte modem) to the Internet, while the artificial clients used for probing may have direct connections, cable modem connections, Integrated Services Digital Network (ISDN) connections, or Digital Subscriber Line (DSL) connections. Thus, there may not always be correlation in the performance/reliability reported by the probing service and that experienced by actual end users.

Finally, it is difficult to determine the breakdown between network and server-side performance using active probing, making it difficult for service providers to determine where best to place their optimization efforts. That is, active probing techniques indicate the end-to-end performance measurement for a web page, but it does not indicate the amount of latency that is attributable to the web server and the amount of latency that is attributable to the network. For instance, a service provider may be unable to alter the latency caused by congestion on the network, but the service provider may be able to evaluate and improve its server's performance if much of the latency is due to the server (e.g., by decreasing the number of processes running on the server, re-designing the web page, altering the web server's architecture, etc.).

The second technique for measuring performance, the web page instrumentation technique, associates code (e.g., JAVASCRIPT) with target web pages. The code, after being downloaded into the client browser, tracks the download time for individual objects and reports performance characteristics back to the web site. That is, in this technique, instrumentation code embedded in web pages and downloaded to the client is used to record access times and report statistics back to the server. For example, a web page may be coded to include instructions that are executable to measure the download time for objects of the web page. Accordingly, when a user requests the web page, the coded instrumentation portion of the web page may first be downloaded to the client, and such instrumentation may execute to measure the time for the client receiving each of the other objects of the web page.

As an example, WEB TRANSACTION OBSERVER (WTO) from HEWLETT PACKARD's OPENVIEW suite uses JAVASCRIPT to implement such a web page instrumentation technique (see e.g., http://www.openview.hp.com/). With additional web server instrumentation and cookie techniques, this product can record the server processing time for a request, enabling a breakdown between server and network processing time. A number of other products and proposals employ similar techniques, such as the TIVOLI WEB MANAGEMENT SOLUTIONS available from IBM CORPORATION (see http://www.tivoli.com/products/demos/twsm.html), CANDLE CORPORATION'S EBUSINESS ASSURANCE (see http://www.candle.com/), and "Measuring Client-Perceived Response Times on the WWW" by R. Rajamony and M. Elnozahy at Proceedings of the Third USENIX Symposium on Internet Technologies and Systems (USITS), March 2001, San Francisco.

Because the web page instrumentation technique downloads instrumentation code to actual clients, this technique can capture end-to-end performance information from real clients, as opposed to capturing end-to-end performance information for synthetic (or "artificial") clients, as with the above-described active probing techniques. However, the web page instrumentation technique fails to capture connection establishment times (because the instrumentation code is not downloaded to a client until after the connection has been established), which are potentially an important aspect of overall performance. Further, there is a certain amount of resistance in the industry to the web page instrumentation technique. The web page instrumentation technique requires additional server-side instrumentation and dedicated resources to actively collect performance reports from clients. For example, added instrumentation code is required to be included in a web page to be monitored, thus increasing the complexity associated with coding such web page and introducing further potential for coding errors that may be present in the web page (as well as further code maintenance that may be required for the web page).

BRIEF SUMMARY OF THE INVENTION

According to one embodiment of the present invention, a method for reconstructing client web page accesses is provided that comprises capturing network-level information for client accesses of at least one web page. The method further comprises constructing a knowledge base of reliable information identifying content of at least one web page, and reconstructing at least one client web page access from the captured network-level information using the reliable information of the knowledge base. Another embodiment of the present invention provides a method for reconstructing client information accesses. The method comprises capturing network-level information for client accesses of server information from a server, wherein each client access of the server information comprises a plurality of transactions. The method further comprises using the captured network-level information for at least one of the plurality of transactions for constructing a knowledge base of reliable information identifying content of the server information, and using the knowledge base for relating the plurality of transactions to their corresponding client access of the server information.

BRIEF DESCRIPTION OF THE DRAWINGS

For a more complete understanding of the present invention, reference is now made to the following descriptions taken in conjunction with the accompanying drawing, in which:

FIG. 6 shows an example operational flow diagram for relating the transactions of a transaction log to web page accesses in accordance with a preferred embodiment of the present invention;

FIG. 7 shows an example hash table (or Client Access Table) for grouping transactions into their corresponding web page accesses in accordance with a preferred embodiment of the present invention;

DETAILED DESCRIPTION OF THE INVENTION

Figure 1:
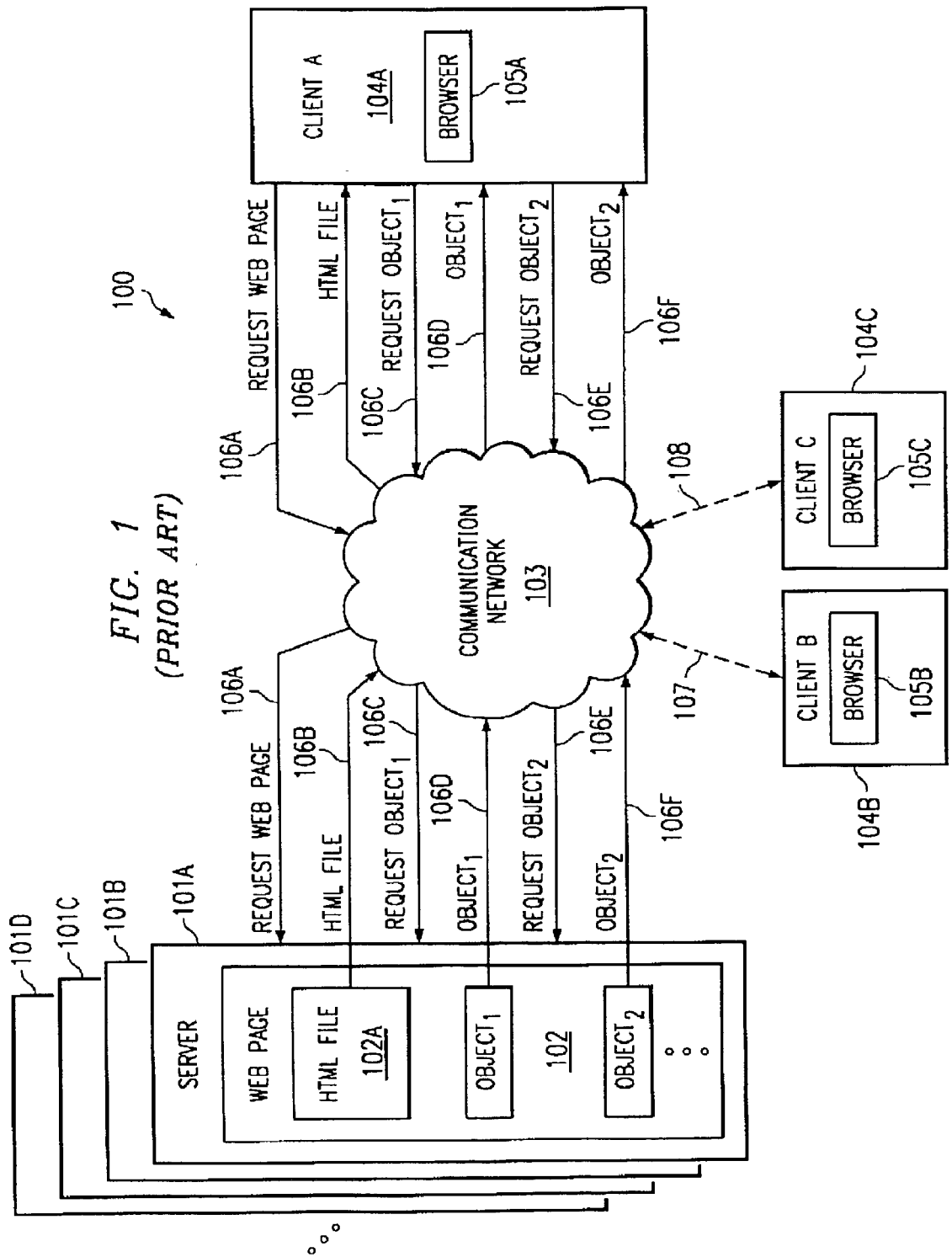
FIG. 1 shows an example client-server system in which embodiments of the present invention may be implemented.

As described above, service providers in a client-server network (e.g., website providers) often desire to have an understanding of their client-perceived end-to-end performance characteristics. In the web forum, the client-perceived end-to-end performance is the client-perceived time for downloading a requested web page from a website. Accordingly, the performance related to web page downloading is one of the critical elements in evaluating end-to-end performance of website providers. As described above, a web page is generally composed of a mark-up language file, such as an HTML, XML, HDML, or WML file, and several embedded objects, such as images. A browser executing at a client computer retrieves a web page by issuing a series of HTTP requests for all objects of the desired web page. The HTTP requests can be sent through one persistent TCP connection or multiple concurrent connections. However, HTTP does not provide any means to delimit the beginning or the end of a web page, which makes it difficult for the server to determine the client-perceived end-to-end performance. Accordingly, a desire exists for the capability to reconstruct a web page access in order, for example, to measure the client-perceived end-to-end performance in serving up such web page.

Various embodiments of the present invention are now described with reference to the above figures, wherein like reference numerals represent like parts throughout the several views. As described further below, embodiments of the present invention use captured network-level information (e.g., network packets) to reconstruct client web page accesses. For instance, embodiments of the present invention group the corresponding web page access transactions in order to reconstruct a client's access of such web page. Preferably, network-level information (e.g., network packets) is captured on the server side of a client-server network, and such network-level information is then used to reconstruct a client access of server information (e.g., a web page). Accordingly, the reconstructed web page access may, in certain implementations, be utilized to measure the client-perceived end-to-end performance in receiving the web page from the server. Embodiments of the present invention use a knowledge base of reliable information about the content of web pages to improve the accuracy of reconstructing client web page accesses. More specifically, embodiments of the present invention construct a knowledge base of information using transactions that include information directly identifying the web page to which the objects of such transactions correspond. Transactions that contain information directly referencing or identifying the web page to which their object corresponds can be used to confidently determine such web page. Less confident transactions, such as those that do not contain information directly identifying their corresponding web page may be accurately grouped into the proper web page accesses using information from the constructed knowledge base.

Turning to FIG. 1, an example client-server system 100 is shown in which embodiments of the present invention may be implemented. As shown, one or more servers 101A-101D may provide services to one or more clients, such as clients A-C (labeled 104A-104C, respectively), via communication network 103. Communication network 103 is preferably a packet-switched network, and in various implementations may comprise, as examples, the Internet or other wide area network (WAN), an Intranet, local area network (LAN), wireless network, public (or private) switched telephony network (PSTN), a combination of the above, or any other communications network now known or later developed within the networking arts that permits two or more computers to communicate with each other.

In a preferred embodiment, servers 101A-101D comprise web servers that are utilized to serve up web pages to clients A-C via communication network 103 in a manner as is well known in the art. Accordingly, system 100 of FIG. 1 illustrates an example of servers 101A-101D serving up web pages, such as web page 102, to requesting clients A-C. Of course, embodiments of the present invention are not limited in application to reconstructing web page accesses within a web environment, but may instead be implemented for reconstructing many other types of client accesses of a server. For example, clients may access server(s) in various other types of client-server environments in order to receive information from such server(s). Further, the information may be communicated from the server(s) to the clients through a plurality of transactions (e.g., a plurality of requests/responses) via a packet-switched network. Embodiments of the present invention may be implemented to utilize network packets captured during the transactions between the client and server to reconstruct the client accesses of the server. For instance, embodiments of the present invention may be implemented to group the corresponding transactions for communicating particular information (e.g., a web page) to a client in order to reconstruct the client's access of such particular information from the server. Accordingly, the reconstructed access may, in certain implementations, be utilized to measure the client-perceived end-to-end performance in receiving the particular information from the server.

In the example of FIG. 1, web page 102 comprises an HTML (or other mark-up language) file 102A (which may be referred to herein as a "main page"), and several embedded objects (e.g., images, etc.), such as $Object_1$, and $Object_2$. Techniques for serving up such web page 102 to requesting clients A-C are well known in the art, and therefore such techniques are only briefly described herein. In general, a browser, such as browsers 105A-105C, may be executing at a client computer, such as clients A-C. To retrieve a desired web page 102, the browser issues a series of HTTP requests for all objects of the desired web page. For instance, various client requests and server responses are communicated between client A and server 101A in serving web page 102 to client A, such as requests/responses 106A-106F (referred to collectively herein as requests/responses 106). Requests/responses 106 provide a simplified example of the type of interaction typically involved in serving a desired web page 102 from server 101A to client A. As those of skill in the art will appreciate, requests/responses 106 do not illustrate all interaction that is involved through TCP/IP communication for serving a web page to a client, but rather provides an illustrative example of the general interaction between client A and server 101A in providing web page 102 to client A.

When a client clicks a hypertext link (or otherwise requests a URL) to retrieve a particular web page, the browser first establishes a TCP connection with the web server by sending a SYN packet (not shown in FIG. 1). If the server is ready to process the request, it accepts the connection by sending back a second SYN packet (not shown in FIG. 1) acknowledging the client's SYN. At this point, the client is ready to send HTTP requests 106 to retrieve the HTML file 102A and all embedded objects (e.g., $Object_1$, and $Object_2$), as described below.

First, client A makes an HTTP request 106A to server 101A for web page 102 (e.g., via client A's browser 105A). Such request may, as examples, be in response to a user inputting the URL for web page 102 or in response to a user clicking on a hyperlink to web page 102. Server 101A receives the HTTP request 106A and sends HTML file 102A (e.g., file "index.html") of web page 102 to client A via response 106B. HTML file 102A typically identifies the various objects embedded in web page 102, such as $_1$ Object, and $Object_2$. Accordingly, upon receiving HTML file 102A, browser 105A requests the identified objects, $Object_1$, and $Object_2$, via requests 106C and 106E. Upon server 101 A receiving the requests for such objects, it communicates each object individually to client A via responses 106D and 106F, respectively.

Again, the above interactions are simplified to illustrate the general nature of requesting a web page, from which it should be recognized that each object of a web page is requested individually by the requesting client and is, in turn, communicated individually from the server to the requesting client. The above requests/responses 106 may each comprise multiple packets of data. Further, the HTTP requests can, in certain implementations, be sent from a client through one persistent TCP connection with server 101A, or, in other implementations, the requests may be sent through multiple concurrent connections. Server 101A may also be accessed by other clients, such as clients B and C of FIG. 1, and various web page objects may be communicated in a similar manner to those clients through packet communication 107 and 108, respectively.

In general, the client-perceived end-to-end performance for receiving web page 102 is measured from the time that the client requests web page 102 to the time that the client receives all objects of the web page (i.e., receives the full page). However, HTTP does not provide any means to delimit the beginning or the end of a web page. For instance, HTTP is a stateless protocol in which each HTTP request is executed independently without any knowledge of the requests that came before it. Accordingly, it is difficult at a server side 101 A to reconstruct a web page access for a given client without parsing the original HTML file.

Embodiments of the present invention enable a passive technique for reconstructing web page accesses from captured network-level information. That is, network packets acquired by a network-level capture tool, such as the well-known UNIX tcpdump tool, may be used to determine (or reconstruct) a client's web page access. From such reconstruction of the client's web page access, the client-perceived end-to-end response time for a web page download may be determined. Thus, various embodiments of the present invention enable a passive, end-to-end monitor that is operable to reconstruct client web page accesses using captured network-level information.

Figure 2:
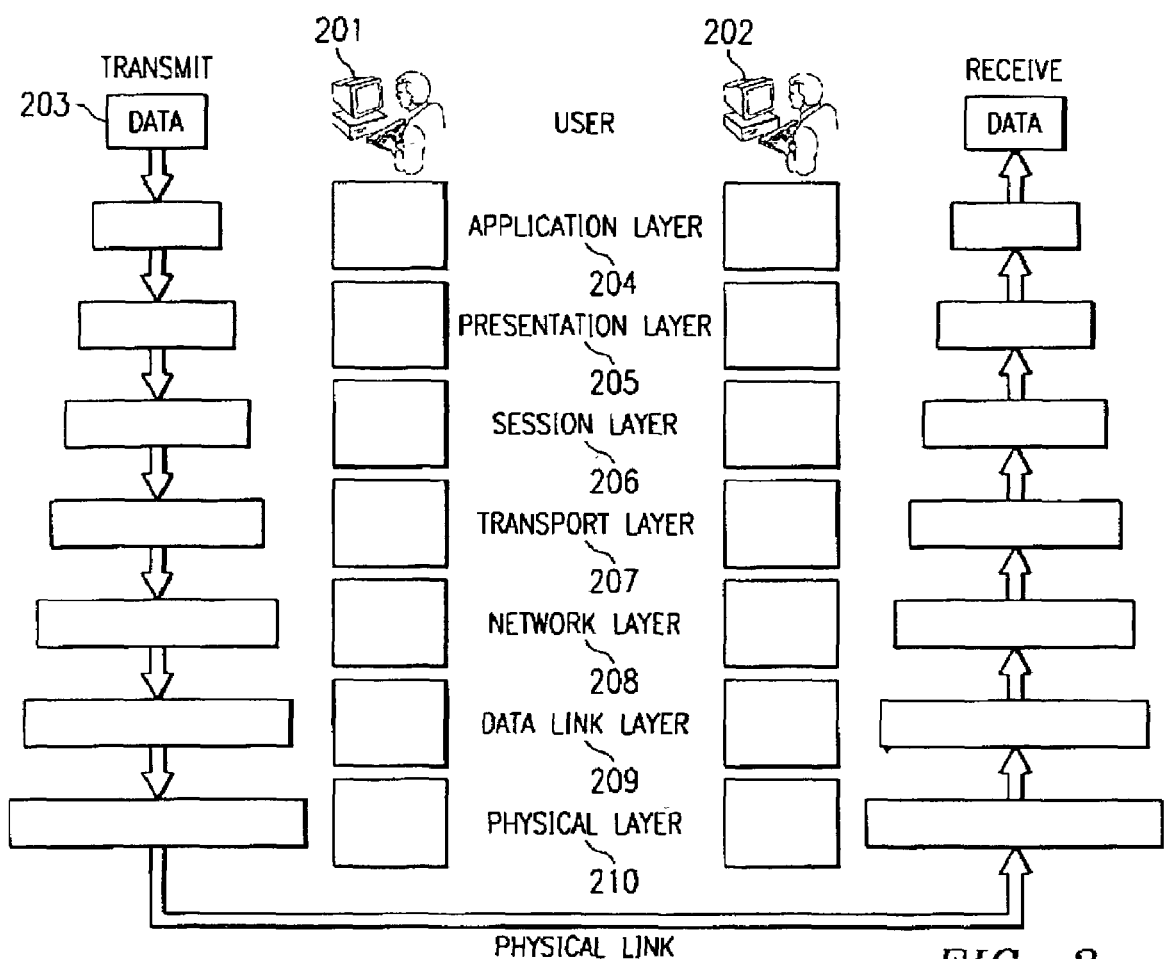
FIG. 2 shows the well-known Open System Interconnection (OSI) model for a network framework.

The "network level" may be better understood with reference to the well-known Open System Interconnection (OSI) model, which defines a networking framework for implementing protocols in seven layers. The OSI model is a teaching model that identifies functionality that is typically present in a communication system, although in some implementations two or three OSI layers may be incorporated into one. The seven layers of the OSI model are briefly described hereafter in conjunction with FIG. 2. According to the OSI model, data 203 is communicated from computer (e.g., server) 201 to computer (e.g., client) 202 through the various layers. That is, control is passed from one layer to the next, starting at the application layer 204 in computer 201, proceeding to the bottom layer, over the channel to computer 202, and back up the hierarchy.

In general, application layer 204 supports application and end-user processes. Communication partners are identified, quality of service is identified, user authentication and privacy are considered, and any constraints on data syntax are identified. This layer provides application services for file transfers, e-mail, and other network software services. For example, a client browser executes in application layer 204.

According to the OSI model, presentation layer 205 provides independence from differences in data representation (e.g., encryption) by translating from application to network format, and vice versa. Presentation layer 205 works to transform data into the form that the application layer 204 can accept. This layer 205 formats and encrypts data to be sent across a network, providing freedom from compatibility problems. It is sometimes called the "syntax layer."

Session layer 206 of the OSI model establishes, manages and terminates connections between applications. Session layer 206 sets up, coordinates, and terminates conversations, exchanges, and dialogues between the applications at each end of the communication. It deals with session and connection coordination. Transport layer 207 of the OSI model provides transparent transfer of data between end systems, or hosts, and is responsible for end-to-end error recovery and flow control. It ensures complete data transfer.

Network layer 208 of the OSI model provides switching and routing technologies, creating logical paths, such as virtual circuits, for transmitting data from node to node. Thus, routing and forwarding are functions of this layer 208, as well as addressing, internetworking, error handling, congestion control, and packet sequencing.

At data link layer 209 of the OSI model, data packets are encoded and decoded into bits. This layer furnishes transmission protocol knowledge and management and handles errors in the physical layer 210, flow control and frame synchronization. Data link layer 209 may be divided into two sublayers: 1) the Media Access Control (MAC) sublayer, and 2) the Logical Link Control (LLC) sublayer. The MAC sublayer controls how a computer on the network gains access to the data and permission to transmit it. The LLC sublayer controls frame synchronization, flow control and error checking.

Physical layer 210 conveys the bit stream (e.g., electrical impulse, light, or radio signal) through the communication network at the electrical and mechanical level. It provides the hardware means of sending and receiving data on a carrier, including defining cables, cards and physical aspects. Fast Ethernet, RS232, and ATM are example protocols with components of physical layer 210.

As described above, one technique for measuring client-perceived end-to-end performance is the web page instrumentation technique in which instrumentation code is included in a web page and is downloaded from the server to a client. More specifically, in this technique, the web page instrumentation code for a web page is downloaded from a server to the client and is executed by the client's browser (in the application layer 204) to measure the end-to-end time for downloading the web page to the client. Accordingly, such web page instrumentation technique captures information at the application layer 204 for measuring client-perceived end-to-end performance. As described further below, embodiments of the present invention utilize information captured at the network layer 208 to reconstruct client web page accesses, thereby eliminating the requirement of including instrumentation in a web page for measuring end-to-end performance. Thus, embodiments of the present invention enable a server (or other node(s) properly positioned on the communication network) to reconstruct information regarding client web page accesses from captured network layer information (e.g., captured network packets).

Another technique utilized in the prior art for measuring end-to-end performance is the active probing technique. As described above, the active probing technique utilizes artificial clients to actively probe a particular web page (i.e., by actively accessing the particular web page) on a periodic basis and measure the response time for receiving the requested web page. As described further below, embodiments of the present invention provide a passive technique that is capable of utilizing captured network-level information to reconstruct actual client web page accesses. Accordingly, rather than actively probing web pages from artificial clients, embodiments of the present invention enable passive monitoring of web page accesses by actual clients to, for example, measure the client-perceived end-to-end performance for such web pages.

Accordingly, embodiments of the present invention enable actual client web page accesses to be reconstructed without requiring instrumentation code to be included in a web page for monitoring a client's access of such web page (as is required in the web page instrumentation technique). Also, embodiments of the present invention enable actual client web page accesses to be reconstructed, as opposed to monitoring artificial clients as in the active probing technique. Further, embodiments of the present invention provide a passive monitoring technique that enables actual network-level information (e.g., packets) to be captured and used for reconstructing client web page accesses, as opposed to actively probing web pages as in the active probing technique. Thus, a web page provider may utilize an embodiment of the present invention to passively reconstruct web page accesses (e.g., to measure the client-perceived end-to-end performance for such accesses) through captured network-level information from the actual client accesses, rather than actively accessing the web page from "test" client(s) in order to measure the end-to-end performance perceived by the "test" client(s).

Figure 3:
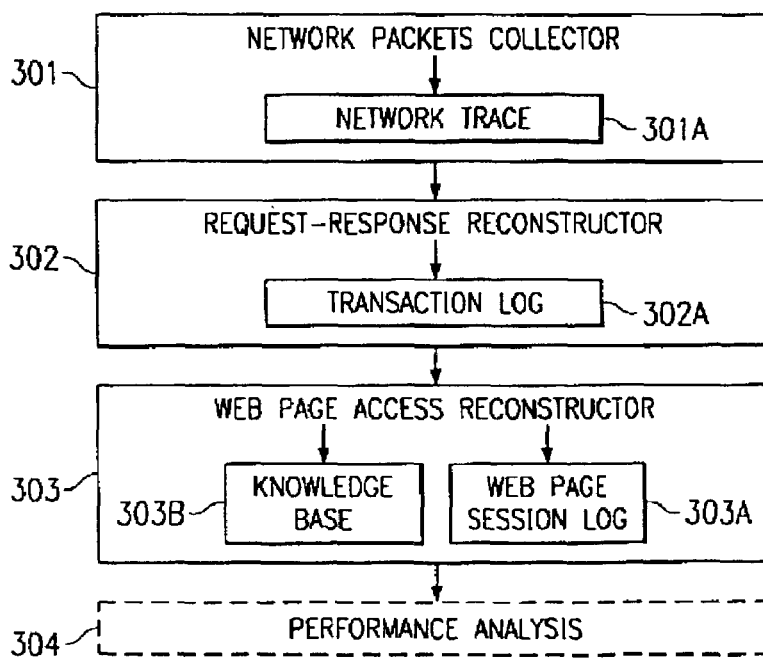
FIG. 3 shows a block diagram of a preferred embodiment of the present invention for reconstructing client accesses of web pages.

A block diagram of a preferred embodiment for reconstructing client accesses of web pages is shown in FIG. 3. As shown, a preferred embodiment comprises network packets collector module 301, request-response reconstructor module 302 (which may be referred to herein as transaction reconstructor module 302), and web page access reconstructor module 303. As described further hereafter, performance analysis module 304 may be included in certain implementations for measuring client-perceived end-to-end performance for the reconstructed web page accesses, thereby forming a passive end-to-end monitor.

Network packets collector module 301 is operable to collect network-level information that is utilized to reconstruct web page accesses. In a preferred embodiment, network packets collector module 301 utilizes a tool to capture network packets, such as the publicly available UNIX tool known as "tcpdump" or the publicly available WINDOWS tool known as "WinDump." The software tools "tcpdump" and "WinDump" are well-known and are commonly used in the networking arts for capturing network-level information for network "sniffer/analyzer" applications. Typically, such tools are used to capture network-level information for monitoring security on a computer network (e.g., to detect unauthorized intruders, or "hackers", in a system). Of course, other tools now known or later developed for capturing network-level information, or at least the network-level information utilized by embodiments of the present invention, may be utilized in alternative embodiments of the present invention.

Network packets collector module 301 records the captured network-level information (e.g., network packets) to a Network Trace file 301A. This approach allows the Network Trace 301A to be processed in offline mode. For example, tcpdump may be utilized to capture many packets (e.g., a million packets) for a given period of time (e.g., over the course of a day), which may be compiled in the Network Trace 301A. Thereafter, such collected packets in the Network Trace 301A may be utilized by request-response reconstructor module 302 in the manner described further below. While a preferred embodiment utilizes a tool, such as tcpdump, to collect network information for processing offline, known programming techniques may be used, in alternative embodiments, to implement a real-time network collection tool. If such a real-time network collection tool is implemented in network packets collector module 301, the various other modules of FIG. 3 may be similarly implemented to use the real-time captured network information to reconstruct web page accesses (e.g., in an on-line mode of operation).

From the Network Trace 301A, request-response reconstructor module 302 reconstructs all TCP connections and extracts HTTP transactions (e.g., a request with the corresponding response) from the payload of the reconstructed TCP connections. More specifically, in one embodiment, request-response reconstructor module 302 rebuilds the TCP connections from the Network Trace 301A using the client IP addresses, client port numbers and the request (response) TCP sequence numbers. Within the payload of the rebuilt TCP connections, the HTTP transactions may be delimited as defined by the HTTP protocol. Meanwhile, the timestamps, sequence numbers and acknowledged sequence numbers may be recorded for the corresponding beginning or end of HTTP transactions. After reconstructing the HTTP transactions, request-response reconstructor module 302 may extract HTTP header lines from the transactions. The HTTP header lines are preferably extracted from the transactions because the payload does not contain any additional useful information for reconstructing web page accesses, but the payload requires approximately two orders of magnitude of additional storage space. The resulting outcome of extracting the HTTP header lines from the transactions is recorded to a Transaction Log 302A, which is described further below. That is, after obtaining the HTTP transactions, request-response reconstructor module 302 stores some HTTP header lines and other related information from Network Trace 301A in Transaction Log 302A for future processing (preferably excluding the redundant HTTP payload in order to minimize storage requirements).

A methodology for rebuilding HTTP transactions from TCP-level traces was proposed by Anja Feldmann in "BLT: Bi-Layer Tracing of HTTP and TCP/IP", *Proceedings of WWW-9*, May 2000, the disclosure of which is hereby incorporated herein by reference. Balachander Krishnamurthy and Jennifer Rexford explain this mechanism in more detail and extend this solution to rebuild HTTP transactions for persistent connections in "Web Protocols and Practice: HTTP/1.1, Networking Protocols, Caching, and Traffic Measurement" pp. 511-522, Addison Wesley, 2001, the disclosure of which is also hereby incorporated herein by reference. Accordingly, in a preferred embodiment of the present invention, request-response reconstructor module 302 uses such methodology for rebuilding HTTP transactions from TCP-level traces.

In an alternative embodiment, Transaction Log 302A may be generated in a kernel-level module implemented on the server as described in greater detail in U.S. Published Patent Application No. 2003/00217130 titled "SYSTEM AND METHOD FOR COLLECTING DESIRED INFORMATION FOR NETWORK TRANSACTIONS AT THE KERNEL LEVEL," the disclosure of which is incorporated herein by reference. Such alternative embodiment may be desired because, for example, it enables information for transactions to be collected at the kernel level of a server (e.g., a web server), which may avoid rebuilding the transactions at the user level as in the methodology proposed by Anja Feldmann. Such alternative embodiment may enable greater computing efficiency in generating Transaction Log 302A because the transactions are not required to be reconstructed at the user level, and/or it may require less storage space because only the desired information for transactions may be communicated from the kernel level to the user level as opposed to the raw network information of Network Trace 301 A being stored at the user level (which may include much more information than is desired for each transaction), as described further in the above-referenced U.S. Patent Application "SYSTEM AND METHOD FOR COLLECTING DESIRED INFORMATION FOR NETWORK TRANSACTIONS AT THE KERNEL LEVEL."

As described above, a web page is generally composed of one HTML file and some embedded objects, such as images or JAVASCRIPTS. When a client requests a particular web page, the client's browser should retrieve all the page-embedded images from a web server in order to display the requested page. The client browser retrieves each of these embedded images separately. As illustrated by the generic example of FIG. 1, each object of a requested web page is retrieved from a server by an individual HTTP request made by the client. An HTTP request-response pair may be referred to collectively herein as an HTTP "transaction." Entries of Transaction Log 302A contain information about these individual HTTP transactions (i.e., requests/responses).

Once information about various individual HTTP transactions is collected in Transaction Log 302A (e.g., either from Network Trace 301A or from a kernel level module), the next step in reconstructing a web page access is to relate the different individual HTTP transactions in the sessions corresponding to a particular web page access. That is, the various different HTTP transactions collected in Transaction Log 302A are related together as logical web pages. In a preferred embodiment, web page access reconstructor module 303 is responsible for grouping the underlying physical object retrievals together into logical web pages, and stores them in Web Page Session Log 303A. More specifically, web page access reconstructor module 303 analyzes Transaction Log 302A and groups the various different HTTP transactions that correspond to a common web page access. Thus, Web Page Session Log 303A comprises the HTTP transactions organized (or grouped) into logical web page accesses.

Embodiments of the present invention use a "knowledge base" of web page content to aid in accurately grouping the HTTP transactions to their corresponding web page accesses. For instance, in a preferred embodiment, web page access reconstructor module 303 evaluates the collected transactions based on "trustable heuristics" to generate knowledge base 303B (e.g., a database or other suitable arrangement of data) that identifies the content of web pages accessed by a client. That is, web page access reconstructor module 303 first evaluates the collected transactions to determine those transactions that comprise information from which the web page to which the object being communicated in such transaction corresponds can be confidently determined. For example, certain transactions may include information (e.g., a Referer field described with Table 1 below) that directly identifies the web page to which the object of such transaction corresponds (e.g., is embedded). Using those transactions determined to comprise such information that directly identifies their corresponding web page, this "trusted" information regarding the content of web pages accessed by a client is stored to knowledge base 303B. Thus, knowledge base 303B comprises information that reliably identifies the content (e.g., embedded objects) of web pages accessed by client(s).

Because some transactions in Transaction Log 302A may not include information directly identifying their corresponding web page, knowledge base 303B may be used to aid in grouping those transactions. Thus, once constructed, knowledge base 303B is used by web page access reconstructor module 303 to accurately reconstruct web page accesses from the collected transactions of Transaction Log 302A. That is, once knowledge base 303B is compiled containing reliable information about the content of web pages accessed by a client, web page access reconstructor module 303 again evaluates the transactions of Transaction Log 302A (e.g., makes a second pass through Transaction Log 302A) using information from knowledge base 303B to accurately reconstruct client web page accesses. More specifically, knowledge base 303B aids web page access reconstructor module 303 in determining the web page in which a given object is embedded, which aids web page access reconstructor module 303 in accurately grouping a transaction that communicates the given object to the appropriate web page access. Thus, knowledge base 303B may aid in accurately grouping a transaction that does not contain information directly identifying the web page to which the object communicated in the transaction corresponds (e.g., transactions that do not have the Referer field, described in Table 1 below, set).

After the various request-response pairs (i.e., HTTP transactions) of Transaction Log 302A are grouped into web page retrieval sessions (or "web page accesses") in Web Page Session Log 303A, performance analysis and statistics module 304 may, in certain implementations, be utilized to measure the client-perceived end-to-end response time for a web page download. That is, once the HTTP transactions for a common web page access are grouped together in Web Page Session Log 303A, such grouping of HTTP transactions may be utilized to measure the client-perceived end-to-end performance for each reconstructed web page access.

Figure 4:
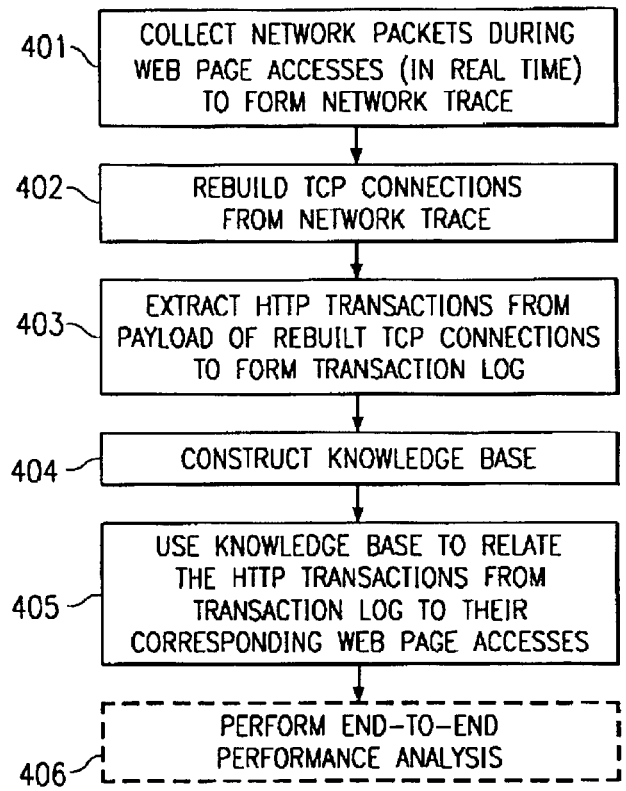
FIG. 4 shows an example operational flow diagram of a preferred embodiment of the present invention.

Turning to FIG. 4, an example operational flow diagram of a preferred embodiment of the present invention is shown. As shown, in operational block 401, network packets are collected by the network packets collector module 301 during client web page accesses in order to form Network Trace 301A. More specifically, network-level information may be captured in real-time (i.e., as client web page accesses are occurring) using, for example, tcpdump or other network information capture tool. The captured information may be stored in Network Trace 301A for later, off-line evaluation thereof.

In operational block 402, request-response reconstructor module 302 rebuilds the TCP connections from the Network Trace 301A. Thereafter, in operational block 403, request-response reconstructor module 302 extracts HTTP transactions from the payload of the rebuilt TCP connections to form Transaction Log 302A.

In operational block 404, web page access reconstructor module 303 analyzes each transaction of Transaction Log 302A to construct knowledge base 303B that contains information that reliably identifies the content (e.g., embedded objects) of web pages accessed by client(s) using the transactions that include information directly identifying their corresponding web page. A technique for constructing such knowledge base 303B in accordance with a preferred embodiment of the present invention is described more fully hereafter in conjunction with the example flow diagrams of FIGS. 6 and 8.

Once knowledge base 303B is constructed, web page access reconstructor module 303 again analyzes the transactions of Transaction Log 302A, in operational block 405, to relate the transactions of Transaction Log 302A to their corresponding web page accesses, using information from knowledge base 303B to aid in relating at least one of such transactions to their corresponding web page accesses. That is, in operational block 405, web page access reconstructor module 303 relates each of the transactions stored in Transaction Log 302A to the respective web page access to which such transaction corresponds, thereby forming web page session log 303A that comprises reconstructed client web page accesses. Knowledge base 303B may be used for at least one of the transactions in determining the web page access to which such transaction corresponds. For example, in a preferred embodiment, knowledge base 303B is used to aid in determining the web page access to which a transaction corresponds if the Referer field (see Table 1 below) for such transaction is not set. Once the web page accesses are reconstructed, end-to-end performance analysis (or other performance measurements) may, in certain implementations, be computed for such web page accesses in operational block 406 (shown in dashed-line in FIG. 4 as being optional in this example). Examples of performance analysis that may be performed on such reconstructed web page accesses are described further in U.S. Published Patent Application No. 2003/02100 A1 entitled "SYSTEM AND METHOD FOR MEASURING WEB SERVICE PERFORMANCE USING CAPTURED NETWORK PACKETS", the disclosure of which is incorporated herein by reference.

Thus, embodiments of the present invention capture HTTP transactions and relate such transactions to reconstruct client web page accesses (operational block 405 of FIG. 4). That is, embodiments of the present invention determine the one(s) of various captured HTTP transactions that correspond to a common web page access and group those transactions together. Further, embodiments of the present invention compile a knowledge base 303B from the captured HTTP transactions that comprise information directly identifying the web page to which the object of such transaction corresponds. The knowledge base provides reliable information about web page content that may be used to accurately group transactions that do not contain such reliable information directly identifying their corresponding web page. Once the various transactions that comprise a web page access are grouped together, those transactions may be evaluated to, for example, determine the client-perceived end-to-end performance of the web page access to which those transactions relate.

Figure 5:
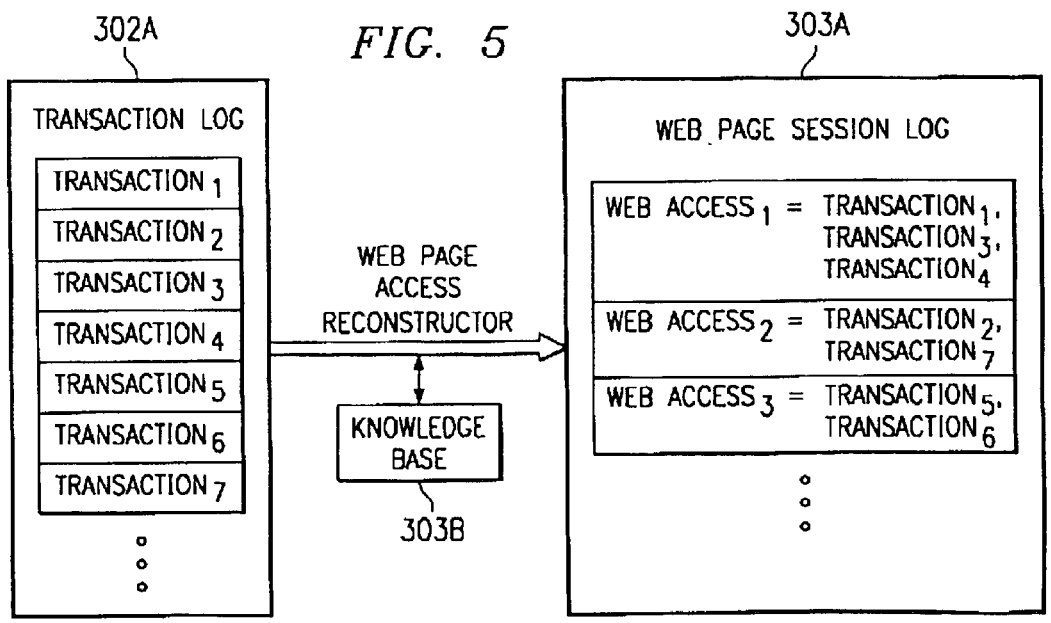
FIG. 5 shows a block diagram of reconstructing web accesses from captured HTTP transactions.

Turning to FIG. 5, a block diagram of reconstructing web page accesses from captured HTTP transactions is shown. As shown, Transaction Log 302A may include various HTTP transactions acquired for client accesses of a server (e.g., $Transaction_1$-$Transaction_7$ in the example of FIG. 5). Web page access reconstructor module 303 relates each of the transactions of Transaction Log 302A to the respective web page access to which such transaction corresponds, thereby forming web page session log 303A that comprises reconstructed client web page accesses. Web page access reconstructor module 303 may, for certain transactions, access knowledge base 303B to determine the web page access to which such transactions correspond.

For instance, in the example of FIG. 5, Transaction$_1$, Transaction$_3$, and Transaction$_4$ are related (or grouped) together for a first web page access, Web Access$_1$. For example, Transaction$_1$, may be the transaction for downloading an HTML file for a web page to the client (such as HTML file 102A in the example of FIG. 1), and Transaction$_3$ and Transaction$_4$ may each be transactions for downloading embedded objects (e.g., images) for the web page (such as Object$_1$, and Object$_2$ in the example of FIG. 1). Suppose that Transaction$_4$ does not include information directly identifying its corresponding web page (e.g., its Referer field is not set); in accordance with embodiments of the present invention, web page access reconstructor module 303 may analyze knowledge base 303B to attempt to accurately relate Transaction$_4$ to its corresponding web page access. More specifically, web page access reconstructor module may analyze knowledge base 303B to determine whether such knowledge base 303B identifies a web page that includes the object of Transaction$_4$. If such a web page is found among any existing web page entries in the current client web page table using the knowledge base 303B, then web page access reconstructor module 303B may use this information to relate Transaction$_4$ to the appropriate web page access (e.g., Web Access$_1$ in the example of FIG. 5).

Additionally, in the example of FIG. 5, Transaction$_2$ and Transaction$_7$ are related (or grouped) together for a second web page access, Web Access$_2$. For example, Transaction$_2$ may be the transaction for downloading an HTML file for a web page to the client and Transaction$_7$ may be a transaction for downloading an embedded object for the web page. Further, in the example of FIG. 5, Transaction$_5$ and Transaction$_6$ are related (or grouped) together for a third web page access, Web Access$_3$. For example, Transaction$_5$ may be the transaction for downloading an HTML file for a web page to the client and Transaction$_6$ may be a transaction for downloading an embedded object for the web page.

Once the web page accesses are reconstructed in this manner in web page session log 303A, end-to-end performance analysis (or other performance measurements) may be computed for such web page accesses (e.g., operational block 406 of FIG. 4). For instance, Transaction$_1$, Transaction$_3$, and Transaction$_4$ may be evaluated to determine the client-perceived end-to-end performance for Web Access$_1$ in the manner as described further in U.S. Published Patent Application No. 2003/022100 A1 entitled "SYSTEM AND METHOD FOR MEASURING WEB SERVICE PERFORMANCE USING CAPTURED NETWORK PACKETS".

As described above in conjunction with FIG. 3, in a preferred embodiment request-response reconstructor module 302 reconstructs all TCP connections and generates a detailed HTTP Transaction Log 302A in which every HTTP transaction (a request and the corresponding response) has an entry. Each entry of the Transaction Log 302A is shown generically in the example of FIG. 5 as "TransactionN", wherein "N" is the entry number. Table 1 below describes in greater detail the format of an entry in HTTP Transaction Log 302A of a preferred embodiment.

TABLE 1

| Field | Value |
| --- | --- |
| URL | The URL of the transaction. |
| Referer | The value of the header field Referer, if it exists. |
| Content Type | The value of the header field Content-Type in the responses. |

TABLE 1-continued

| Field | Value |
| --- | --- |
| Flow ID | A unique identifier to specify the TCP connection of this transaction. |
| Source IP | The client's IP address. |
| Request Length | The number of bytes of the HTTP request. |
| Response Length | The number of bytes of the HTTP response. |
| Content Length | The number of bytes of HTTP response body. |
| Request SYN timestamp | The timestamp of the SYN packet from the client. |
| Request Start timestamp | The timestamp for receipt of the first byte of the HTTP request. |
| Request End timestamp | The timestamp for receipt of the last byte of the HTTP request. |
| Start of Response | The timestamp when the first byte of response is sent by the server to the client. |
| End of Response | The timestamp when the last byte of response is sent by the server to the client. |
| ACK of Response Timestamp | The ACK packet from the client for the last byte of the HTTP response. |
| Response Status | The HTTP response status code. |
| Via Field | Identification of whether the HTTP field Via is set. |
| Aborted | Identification of whether the transaction is aborted. |
| Resent Request Packets | The number of packets resent by the client. |
| Resent Response Packet | The number of packets resent by the server. |

The first field provided in the example Transaction Log entry of Table 1 is the URL field, which stores the URL for the HTTP transaction (e.g., the URL for the object being communicated to the client in such transaction). The next field in the entry is the Referer field. As described above with FIG. 1, typically when a web page is requested, an HTML file 102A is first sent to the client, such as a file "index.html", which identifies the object(s) to be retrieved for the web page, such as Object$_1$, and Object$_2$ in the example of FIG. 1. When the objects for the requested web page (e.g., Object$_1$, and Object$_2$) are retrieved by the client via HTTP transactions (in the manner described above with FIG. 1), the Referer field identifies that those objects are embedded in (or are part of) the requested web page (e.g., the objects are associated with the index.html file in the above example). Accordingly, when transactions for downloading various different objects have the same Referer field, such objects belong to a common web page. The HTTP protocol defines such a Referer field, and therefore, the Referer field for a transaction may be taken directly from the captured Network Trace information for such transaction. More specifically, in the HTTP protocol, the referer request-header field allows the client to specify, for the server's benefit, the address (URI) of the resource from which the Request-URI was obtained (i.e., the "referrer", although the header field is misspelled). The referer request-header allows a server to generate lists of back-links to resources for interest, logging, optimized caching, etc.

However, not all HTTP requests for embedded objects contain referer fields. Accordingly, a preferred embodiment uses the Referer field as a main "clue" in reconstructing web page accesses. As described below, embodiments of the present invention may utilize additional heuristics, as well as a knowledge base, to accurately group transactions into their corresponding web page accesses.

The next field provided in the example entry of Table 1 is the Content Type field, which identifies the type of content downloaded in the transaction, such as "text/html" or "image/jpeg", as examples. As described further below, the Content Type field may provide a clue as to whether a transaction is downloading an HTML file, such as "index.html", for a web page, or whether it is downloading an object, such as an image, JAVASCRIPT, etc., that is embedded in a particular web page.

The next field in the entry is Flow ID, which is a unique identifier to specify the TCP connection of this transaction. The Flow ID may provide a further clue regarding whether a transaction is part of a given web page access being reconstructed. The next field in the entry is Source IP, which identifies the IP address of a client to which information is being downloaded in the transaction.

The next field in the example entry of Table 1 is the Request Length field, which identifies the number of bytes of the HTTP request of the transaction. Similarly, the Response Length field is included in the entry, which identifies the number of bytes of the HTTP response of the transaction. The Content Length field is also included, which identifies the number of bytes of the body of the HTTP response (e.g., the number of bytes of an object being downloaded to a client).

The next field in the example entry of Table 1 is the Request SYN timestamp, which is the timestamp of the SYN packet from the client. As described above, when a client clicks a hypertext link (or otherwise requests a URL) to retrieve a particular web page, the browser first establishes a TCP connection with the web server by sending a SYN packet. If the server is ready to process the request, it accepts the connection by sending back a second SYN packet acknowledging the client's SYN. Only after this connection is established can the true request for a web page be sent to the server. Accordingly, the Request SYN timestamp identifies when the first attempt to establish a connection occurred. This field may be used, for example, in determining the latency breakdown for a web page access to evaluate how long it took for the client to establish the connection with the server.

The next field in the entry is the Request Start timestamp, which is the timestamp for receipt of the first byte of the HTTP request of the transaction. Accordingly, this is the timestamp for the first byte of the HTTP request that is received once the TCP connection has been established with the server. The Request End timestamp is also included as a field in the entry, which is the timestamp for receipt of the last byte of the HTTP request of the transaction.

The next field in the entry is the Start of Response field, which identifies the timestamp when the first byte of the response is sent by the server to the client. The entry next includes an End of Response field, which identifies the timestamp when the last byte of the response is sent by the server to the client. The next field in the entry is ACK of Response timestamp, which is the timestamp of the ACK packet (acknowledge packet) from the client for the last byte of the HTTP response of the transaction. As described further below, the Request Start timestamp, Request End timestamp, and ACK of Response timestamp fields may be used in measuring the end-to-end performance perceived by the client for a web page access.

The next field in the example entry of Table 1 is the Response Status field, which is the HTTP response status code. For example, the response status code may be a "successful" indication (e.g., status code 200) or an "error" indication (e.g., status code 404). Typically, upon receiving a client's request for a web page (or object embedded therein), the web server provides a successful response (having status code 200), which indicates that the web server has the requested file and is downloading it to the client, as requested. However, if the web server cannot find the requested file, it may generate an error response (having status code 404), which indicates that the web server does not have the requested file.

The next field in the example entry of Table 1 is the Via field, which is typically set by a proxy of a client. If the client request is received by the server from a proxy, then typically proxies add their request field in the Via field. Thus, the Via field indicates that in fact its not the original client who requested this file, or who is making this request, but rather it is the proxy acting on behalf of the client.

The next field in the example entry of Table 1 is the Aborted field, which indicates whether the current transaction was aborted. For example, the Aborted field may indicate whether the client's TCP connection for such transaction was aborted. Various techniques may be used to detect whether the client's TCP connection with the server and the current transaction, in particular, is aborted, such as those described further in U.S. Published Patent Application No. 2005/0076111 A1 entitled "SYSTEM AND METHOD FOR RELATING ABORTED CLIENT ACCESSES OF DATA TO QUALITY OF SERVICE PROVIDED BY A SERVER IN A CLIENT-SERVER NETWORK", the disclosure of which is incorporated herein by reference.

The next field in the entry is the Resent Request Packets field, which provides the number of packets resent by the client in the transaction. The Resent Response Packet field is the final field in the entry, which provides the number of packets resent by the server in the transaction. These fields may provide information about the network status during the transaction. For instance, if it was necessary for the server to re-send multiple packets during the transaction, this may be a good indication that the network was very congested during the transaction.

Some fields of the HTTP Transaction Log entry may be used to rebuild web pages, as described further below, such as the URL, Referer, Content Type, Flow ID, Source IP, Request Start timestamp, and Response End timestamp fields. Other fields may be used to measure end-to-end performance for a web page access. For example, the Request Start timestamp and the Response End timestamp fields can be used together to calculate the end-to-end response time. The number of resent packets can reflect the network condition. The aborted connection field can reflect the quality of service, as described further in U.S. Published Patent Application No. 2005/0076111 A1 entitled "SYSTEM AND METHOD FOR RELATING ABORTED CLIENT ACCESSES OF DATA TO QUALITY OF SERVICE PROVIDED BY A SERVER IN A CLIENT-SERVER NETWORK", the disclosure of which is incorporated herein by reference.

As an example of network-level information that may be captured and used to populate certain of the above fields of Table 1, consider the following example requests and responses (transactions) for retrieving "index.html" page with the embedded image "imgl.jpg" from a web server "www.hpl.hp.com":

Transaction 1:
   Request: Get/index.html HTTP/1.0
      Host: www.hpl.hp.com
   Response: HTTP/1.0 200 OK
      Content-Type: text/html Transaction 2:
   Request: Get/imgl.jpg HTTP/1.0
      Host: www.hpl.hp.com
      Referer: http://www.hpl.hp.com/index.html
   Response: HTTP/1.0 200 OK
      Content-Type: image/jpeg In the above example, the first request is for the HTML file index.html. The content-type field in the corresponding response shows that it is an HTML file (i.e., content type of "text/html"). Then, the next request is for the embedded image img1.jpg. The request header field referer indicates that the image is embedded in index.html. The corresponding response shows that the content type for this second transaction is an image in jpeg format (i.e., content type of "image/jpeg"). It should be noted that both of the transactions above have a status "200" (or "OK") returned, which indicates that they were successful.

As the above example illustrates, the HTTP header field referer, when set, is a major clue that may be used for grouping objects into their corresponding web page. However, not all HTTP requests for embedded objects contain referer fields. Accordingly, a preferred embodiment utilizes a knowledge base (as well as additional heuristics) to group objects into their corresponding web pages, as described further below.

As described above with FIG. 3, in a preferred embodiment, web page access reconstructor module 303 is capable of constructing a Web Page Session Log 303A from the Transaction Log 302A. In order to measure the client-perceived end-to-end response time for a web page download, it becomes desirable to identify which objects are embedded in a particular web page, or in other words, which HTTP transactions correspond to a given web page access. The response time for client requests retrieving such embedded images from a web server may then be measured. In other words, to measure the client-perceived end-to-end response time, it becomes desirable to group the HTTP transactions into their respective web page accesses (as shown in the example of FIG. 5). Once the HTTP transactions that comprise a particular web page access are determined, the client-perceived end-to-end response time for that particular web page can be measured.

Although some embedded objects of a web page can be determined by parsing the HTML file using HTML syntax (e.g., for IMG or OBJECT elements), some other embedded objects cannot be easily discovered by statically parsing and interpreting HTML syntax. For example, JAVASCRIPT is popularly used in web pages to generate some special visual effects. When a browser executes this type of JAVASCRIPT code, the JAVASCRIPT often needs to first download some images. It is difficult to discover these implicitly embedded images without executing the JAVASCRIPT.

One technique that may be used for detecting web page accesses uses the client's think time as the delimiter between two web page accesses. See e.g., F. Smith, F. Campos, K. Jeffay, and D. Ott, "What TCP/IP Protocol Headers Can Tell Us About the Web", In *Proceedings of ACM SIGMETRICS*, Cambridge, May, 2001, the disclosure of which is hereby incorporated herein by reference. This method is simple and useful. However, it might be inaccurate in many cases. For example, suppose a client opens two web pages from one server at the same time; in this case, the requests for two different web pages interleave each other without any think time between them, and therefore the client think time is not a useful delimiter for that case. As another example, the interval between the requests for the objects within one page are often too long to be distinguishable from client think time (perhaps because of the network conditions), thus making it difficult to delimit web page accesses based on client think time.

Unlike techniques of the prior art, such as the above-described active probing and web page instrumentation techniques, embodiments of the present invention provide a technique for passively reconstructing web page accesses from captured network-level information. Embodiments of the present invention utilize a knowledge base and heuristics to determine the objects composing the web page (in other words: the content of a web page) and apply statistics to adjust the results, as described further below.

As described above, the request-response reconstructor module 302 reconstructs all TCP connections and generates a detailed HTTP Transaction Log 302A in which every HTTP transaction (a request and the corresponding response) has an entry. Table 1 above describes the format of an entry in the HTTP Transaction Log 302A of a preferred embodiment.

As described above with FIG. 4, the operational flow of a preferred embodiment constructs knowledge base 303B (see operational block 404 of FIG. 4). That is, in a preferred embodiment, knowledge base 303B is constructed for transactions that include information directly identifying the web page to which their respective object corresponds. Such knowledge base 303B may be used to aid in reconstructing web page accesses. FIG. 6 shows an example operational flow diagram for relating the transactions of Transaction Log 302A to web page accesses in accordance with a preferred embodiment of the present invention. In operational block 601, attention is directed to the first entry of Transaction Log 302A. In block 602, it is determined whether the entry being considered has a successful response type. That is, the Status Code field for the entry is evaluated to determine whether the transaction for this entry was successful (e.g., having status code "200" sent in the response from the web server). If it is determined in block 602 that the transaction was not successful, then execution advances to block 603 and the entry is excluded from further consideration (i.e., is not used in constructing knowledge base 303B).

If it is determined in block 602 that the transaction was successful, then execution advances to block 604 whereat a determination is made as to whether more entries exist in Transaction Log 302A. If more entries do exist, then attention is directed to the next entry of Transaction Log 302A at block 605, and execution returns to block 602 to evaluate whether this next entry was successful. Accordingly, a preferred embodiment analyzes the transactions collected in Transaction Log 302A to exclude transactions that were unsuccessful from further consideration in constructing knowledge base 303B.

Once it is determined at block 604 that no more entries exist in Transaction Log 302A (i.e., all entries have been examined to detect unsuccessful transactions), the entries are sorted by their Request Start timestamp field (in increasing time order) in operational block 606. Thus, once this sorting is completed, the requests for the embedded objects of a web page must follow the request for the corresponding HTML file. That is, it is known after the sorting that any requests for embedded objects of a web page are arranged in Transaction Log 302A after their corresponding HTML file. Of course, after such sorting, the transactions from different clients may still be interleaved with each other in Transaction Log 302A. Even for one client, the transactions for a single web page may be interleaved with the transactions for other pages.

Accordingly, in operational block 607, the sorted Transaction Log 302A is scanned in order to group the transactions into their corresponding web page accesses. That is, to construct knowledge base 303B, the transactions that are not excluded from consideration (in block 603) are evaluated to associate the objects of such transactions with their corresponding web pages. More specifically, the transactions that are determined to include information directly identifying the web page to which the objects of such transactions correspond (e.g., their Referer Fields are set) are used to construct a knowledge base of the content of client accessed web pages.

To perform this grouping of objects with their respective web page, in a preferred embodiment, the transactions from Transaction Log 302A are organized into a hash table, which may be referred to herein as a Client Access Table, such as the example hash table 700 shown in FIG. 7. The example Client Access Table 700 of FIG. 7 maps a client's IP address to a web page table containing the web pages accessed by the client. Each entry in the web page table is composed of an HTML file and, possibly, some embedded objects for the corresponding web page. As described further below, Client Access Table 700 is used to construct knowledge base 303B (e.g., as a new hash table). Thus, a hash table, such as the Client Access Table 700 of FIG. 7, may be populated with information from Transaction Log 302A that is then used in constructing the knowledge base (e.g., as a final hash table or "content template table", such as that described hereafter with FIG. 9).

For example, as shown in FIG. 7, Client Access Table 700 includes client IP addresses 701, such as $IP_1$, $IP_2$, $IP_3$, ... $IP_n$. Each client's IP address is mapped to a web page table that identifies all web pages accessed by the client in the transactions of Transaction Log 302A. For instance, in the example of FIG. 7, client address $IP_1$ is mapped to web page table 702 that identifies the web pages accessed by such client. More specifically, in this example, web page table 702 comprises three web pages that have been accessed by client $IP_1$. The first web page accessed by client $IP_1$ comprises HTML file $HTML_1$ with embedded objects 703A-703C. The second web page accessed by $IP_1$ comprises HTML file $HTML_2$ with embedded object 704A, and the third web page accessed by $IP_1$ comprises HTML file $HTML_3$ with embedded objects 705A and 705B.

All of the transactions of Transaction Log 302A may not be useful for constructing knowledge base 303B. Accordingly, when populating Client Access Table 700, some of the entries of Transaction Log 302A may be excluded therefrom. As described with FIG. 6 above, entries that are not successful are excluded from consideration. Further, as described below, the content type of the entries is preferably evaluated to determine whether the entry includes information that is reliable for determining the corresponding web page of the object of such entry. Also, in a preferred embodiment, entries that do not have their Referer field set are excluded from further consideration for constructing knowledge base 303B.

Figure 8:
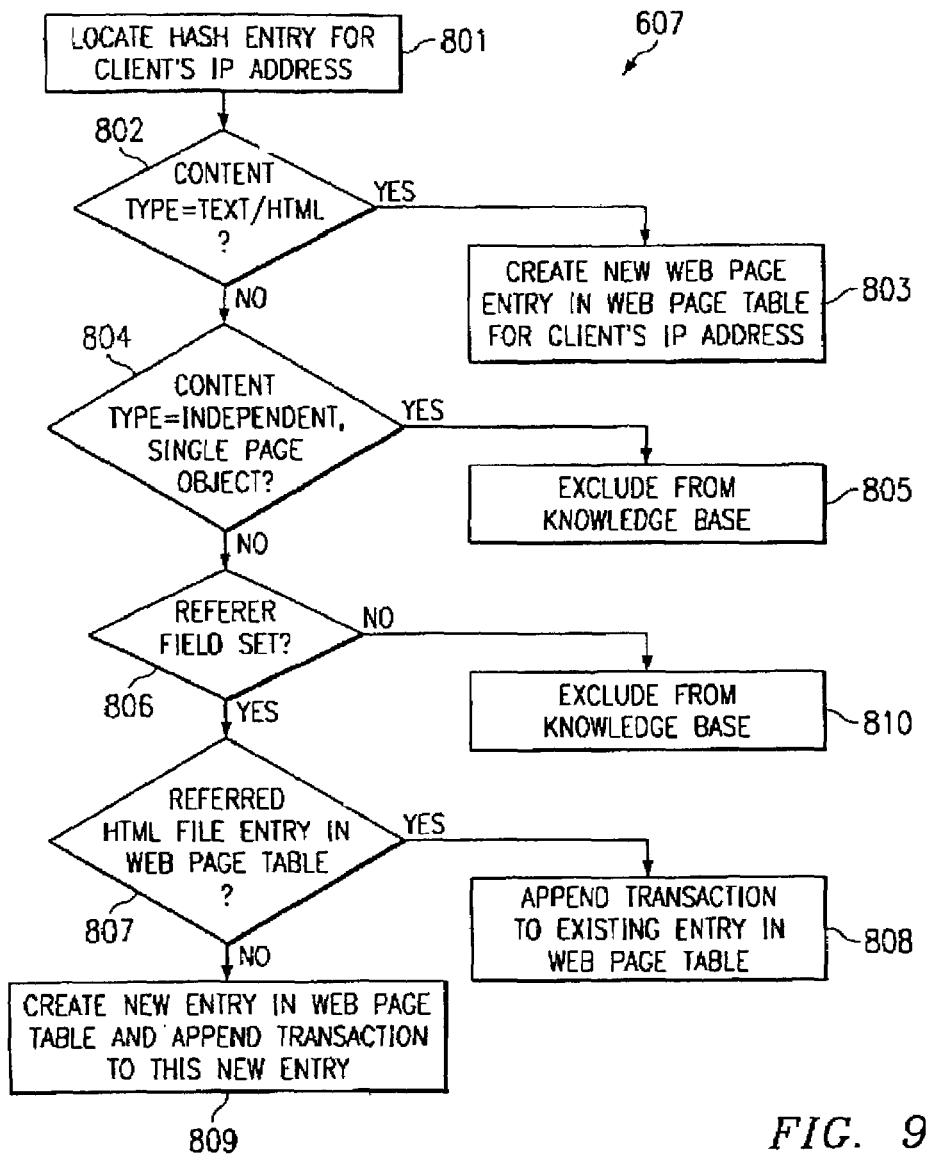
FIG. 8 further shows an example operational flow diagram for constructing a knowledge base of web page content in accordance with a preferred embodiment of the present invention.

The operation of grouping the web page objects (or transactions) into corresponding client web page accesses in order to form knowledge base 303B in accordance with a preferred embodiment is now described in conjunction with the example operational flow shown in FIG. 8. As described above with operational block 607 of FIG. 6, in a preferred embodiment, web page access reconstructor module 303 groups transactions from Transaction Log 302A that comprise information directly relating their object with a corresponding web page into their respective web page accesses (thereby forming knowledge base 303B). FIG. 8 shows operational block 607 of FIG. 6 in further detail. The operation of FIG. 8 is executed for each entry of Transaction Log 302A (that has not been excluded from consideration by operational block 603 of FIG. 6) in order to construct such transactions into their corresponding web page accesses. In processing an entry of Transaction Log 302A, web page access reconstructor module 303 first locates a hash entry for the client's IP address in Client Access Table 700. That is, the Source IP field for the entry (see Table 1) may be used to identify the client's IP address, which is used to locate the corresponding hash table entry (e.g., in client IP addresses 701 of FIG. 7). As mentioned above, Client Access Table 700 is populated and is then used to form knowledge base 303B (e.g., as a new hash table or "content template table", as is described hereafter with the example of FIG. 9).

In a preferred embodiment, in constructing knowledge base 303B, web page access reconstructor module 303 handles the transaction differently depending on its content type. That is, web page access reconstructor module 303 evaluates the transaction's content type in determining whether and/or how such transaction is utilized in constructing knowledge base 303B. For instance, in the example operational flow of FIG. 8, web page access reconstructor module 303 determines whether the transaction's content type is "text/html" in block 802. The transaction's content type is indicated by the Content Type field in Transaction Log 302A. If it is determined that the transaction's content type of a transaction is text/html, web page access reconstructor module 303 treats it as the beginning of a web page. Accordingly, at block 803, web page access reconstructor module 303 creates a new web page entry in the web page table (e.g., table 702 of FIG. 7) for the client's IP address in Client Access Table 700. That is, the transaction being evaluated is identified in Client Access Table 700 as being the HTML file for a new web page access for the client.

Some content types are well-known as independent, single page objects that cannot contain any embedded objects, such as content types: application/postscript, application/x-tar, application/pdf, application/zip, and text/plain. Accordingly, if it is determined in block 802 that the transaction's content type is not "text/html", execution advances to block 804 whereat it is determined whether the transaction's content type indicates that the transaction was for an independent, single page object that does not include embedded objects. If it is determined that the transaction's content type indicates that the transaction was for an independent, single page object (e.g., the transaction's content type is application/postscript, application/x-tar, application/pdf, application/zip, or text/plain, as examples), then such transaction is excluded from further consideration in constructing knowledge base 303B in operational block 805. That is, such transaction is not included in Client Access Table 700.

As for transactions having content types other than "text/html" and other than an independent, single page object type, it is determined that such transactions may involve objects that are embedded in a web page. Accordingly, web page access reconstructor module 303 attempts to associate such objects with the corresponding web page in which they are embedded using information included in the Transaction Log entry for this transaction that directly identifies the web page to which the object of such entry corresponds. A preferred embodiment utilizes the Referer field for the transaction, which, if set, directly identifies the web page to which the object of the transaction corresponds. Thus, in a preferred embodiment, if it is determined at block 804 that the transaction's content type does not indicate that the object is an independent, single page object, execution advances to block 806 whereat it is determined whether the Referer field is set for the transaction. If the header field referer is set for this transaction, web page access reconstructor module 303 can utilize this information in confidently determining which web page the object belongs to.

If the Referer field is set for the transaction, execution advances to block 807 to determine whether the referred HTML file is an existing entry in the web page table for this client (in Client Access Table 700). That is, it is determined whether the value of the transaction's Referer field identifies an existing HTML file entry in the client's web page table in Client Access Table 700. If the referred HTML file is an existing entry in the web page table, then web page access reconstructor module 303 appends this transaction to such existing web page entry in the client's web page table in block 808. However, if the referred HTML file is not an existing entry in the client's web page table, it means that the client accessed this web page without accessing the HTML file, which may be cached somewhere between the client and the web server. In this case, web page access reconstructor module 303 creates a new entry in the client's web page table for the referred HTML file. Web page access reconstructor module 303 then appends the considered object to the newly created web page entry in the client's web page table of Client Access Table 700.

If it is determined at block 806 that the header field referer is not set for this transaction, then the transaction is excluded from further consideration in constructing knowledge base 303B at operational block 810. That is, if the Referer field of this entry of Transaction Log 302A is not set, then the transaction is not included in Client Access Table 700.

Once Client Access Table 700 is constructed (e.g., via the example process of FIG. 8), it is preferably used to form knowledge base 303B. More specifically, web page access reconstructor module 303 preferably determines a content template of any given web page accessed by a client as a combined set of all of the objects that appear in all of the access patterns for such web page in the intermediate hash table. Thus, web page access reconstructor module 303 scans Client Access Table 700 and creates a new hash table (which may be referred to as a "Content Template Table" or as "knowledge base 303B"), such as that shown in FIG. 9, which is used to group the transactions that do not include information directly identifying the web page to which their respective objects corresponds (e.g., the transaction's Referer field is not set).

Figure 9:
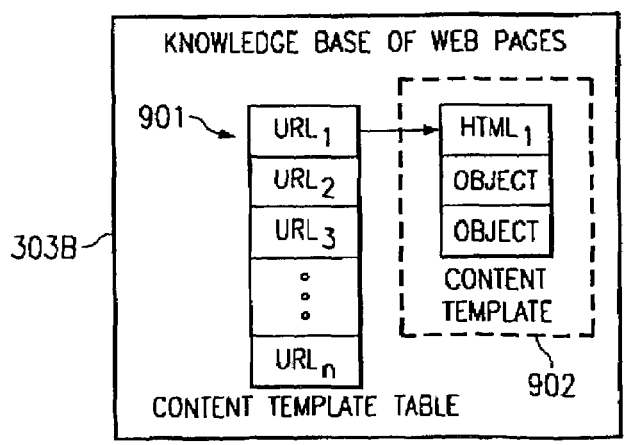
FIG. 9 shows an example data structure for a knowledge base in accordance with a preferred embodiment of the present invention.

Turning to FIG. 9, an example knowledge base 303B is shown, which maps the URLs of web pages to the objects embedded in such web pages. More specifically, knowledge base 303B comprises URL table 901 that includes URLs accessed by client(s) in the transactions of Transaction Log 302A, such as $URL_1$, $URL_2$, $URL_3$, ..., $URL_4$. Each URL is mapped to a content template that identifies the objects known to be embedded in such web page (from the process of FIG. 8). For instance, in the example of FIG. 9, $URL_1$ is mapped to content template 902 that identifies the HTML file ($HTML_1$) and object(s) known to be embedded in such URL.

With the help of knowledge base 303B, web page access reconstructor module 303 processes the entire Transaction Log 302A again, in a preferred embodiment, to construct Web Page Session Log 303A that comprises reconstructed client web page accesses. As described hereafter, in this second pass through Transaction Log 302A, web page access reconstructor module 303 does not exclude the entries that do not have their Referer field set, but instead uses knowledge base 303B to try to accurately determine the web page access to which such entries correspond.

Figure 10:
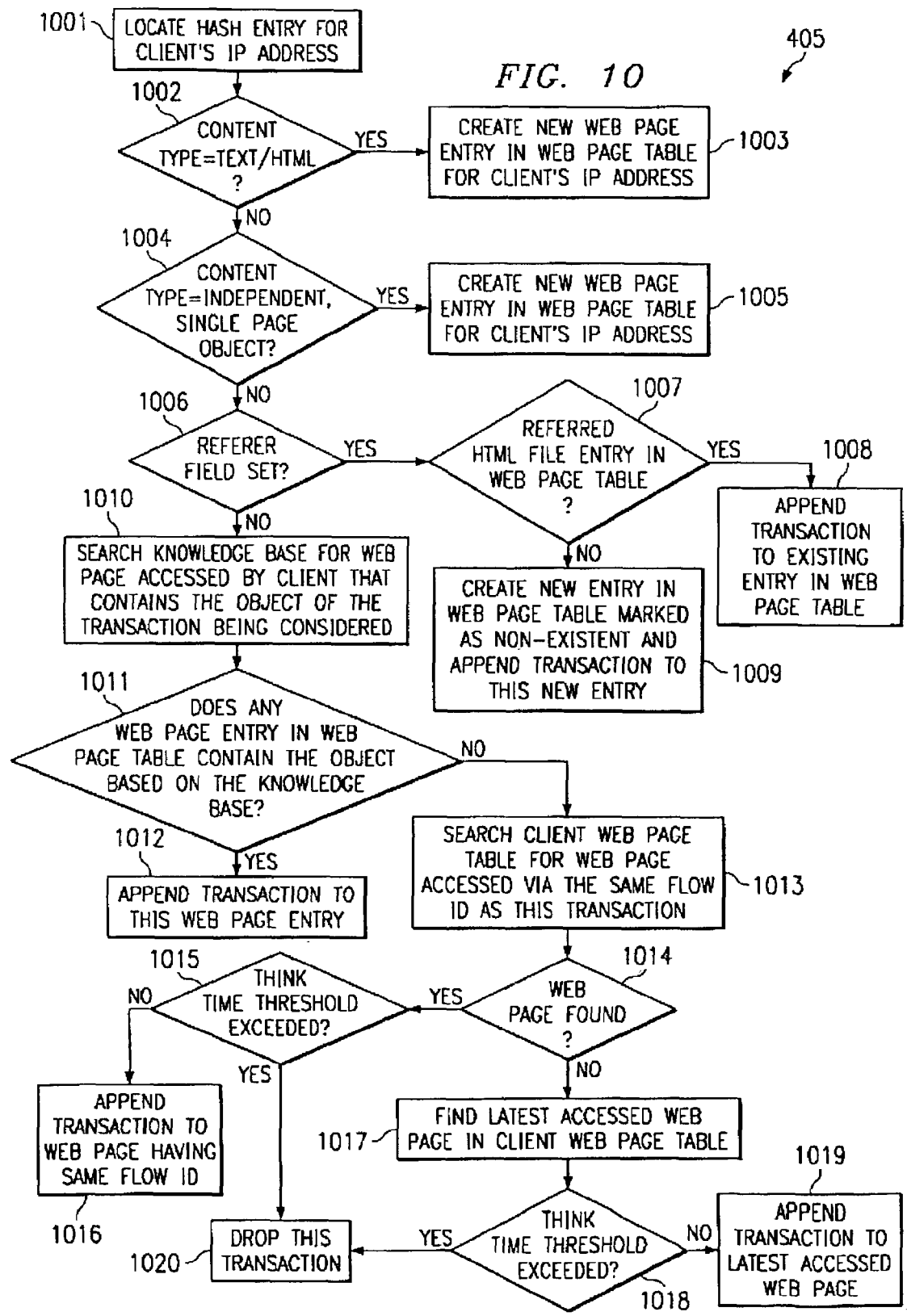
FIG. 10 shows an example operational flow diagram for grouping web page objects (or transactions) into their corresponding client web page accesses to form a Web Page Session Log in accordance with a preferred embodiment of the present invention.

In a preferred embodiment, web page access reconstructor module 303 scans the sorted Transaction Log 302A (i.e., sorted as described in operational block 607 of FIG. 6) and creates a new Client Access Table, such as the example Client Access Table described above in FIG. 7, to store client web page accesses. As described above with operational block 405 of FIG. 4, in a preferred embodiment, web page access reconstructor module 303 groups transactions from Transaction Log 302A into web page accesses (thereby forming Web Page Session Log 303A). FIG. 10 shows operational block 405 of FIG. 4 in further detail. The sorted log obtained in operational block 606 of FIG. 6 (having unsuccessful transactions excluded therefrom) is preferably used in the operation of FIG. 10.

The operation of FIG. 10 is executed for each entry of Transaction Log 302A (that has not been excluded from consideration in block 603 of FIG. 6) in order to construct such transactions into corresponding web page accesses. In processing an entry of Transaction Log 302A, web page access reconstructor module 303 first locates a hash entry for the client's IP address in the new Client Access Table 700, which forms Web Page Session Log 303A. That is, the Source IP field for the entry (see Table 1) may be used to identify the client's IP address, which is used to locate the corresponding hash table entry (e.g., in client IP addresses 701 of FIG. 7).

In a preferred embodiment, web page access reconstructor module 303 handles the transaction differently depending on its content type. That is, web page access reconstructor module 303 evaluates the transaction's content type in determining a web page access to which the transaction corresponds. For instance, in the example operational flow of FIG. 10, web page access reconstructor module 303 determines whether the transaction's content type is "text/html" in block 1002. The transaction's content type is indicated by the Content Type field in Transaction Log 302A. If it is determined that the transaction's content type of a transaction is text/html, web page access reconstructor module 303 treats it as the beginning of a web page. Accordingly, at block 1003, web page access reconstructor module 303 creates a new web page entry in the web page table (e.g., table 702 of FIG. 7) for the client's IP address in Web Page Session Log 303A. That is, the transaction being evaluated is identified in Web Page Session Log 303A as being the HTML file for a new web page access for the client.

As described with FIG. 8 above, some content types are well-known as independent, single page objects that cannot contain any embedded objects, such as content types: application/postscript, application/x-tar, application/pdf, application/zip, and text/plain. Accordingly, if it is determined in block 1002 that the transaction's content type is not "text/html", execution advances to block 1004 whereat it is determined whether the transaction's content type indicates that the transaction was for an independent, single page object that does not include embedded objects. If it is determined that the transaction's content type indicates that the transaction was for an independent, single page object (e.g., the transaction's content type is application/postscript, application/x-tar, application/pdf, application/zip, or text/plain, as examples), then execution advances to block 1005 whereat web page access reconstructor module 303 marks the transaction as being for an individual web page that does not include any embedded objects. Web page access reconstructor module 303 further allocates a new web page entry in the client's web page table in Web Page Session Log 303A for this transaction.

As for transactions having content types other than "text/html" and other than an independent, single page object type, it is determined that such transactions may involve objects that are embedded in a web page. Accordingly, web page access reconstructor module 303 attempts to associate such objects with the corresponding web page in which they are embedded. One technique that is utilized for attempting to relate the transaction for an embedded object with its corresponding web page utilizes the Referer field for the transaction. Thus, if it is determined at block 1004 that the transaction's content type does not indicate that the object is an independent object, execution advances to block 1006 whereat it is determined whether the Referer field is set for the transaction. If the header field referer is set for this transaction, web page access reconstructor module 303 can utilize this information in determining which web page the object belongs to. That is, the Referer field directly identifies the web page to which the object of such transaction corresponds.

If the Referer field is set for the transaction, execution advances to block 1007 to determine whether the referred HTML file is an existing entry in the web page table for this client in Web Page Session Log 303A. That is, it is determined whether the value of the transaction's Referer field identifies an existing HTML file entry in the client's web page table. If the referred HTML file is an existing entry in the web page table, then web page access reconstructor module 303 appends this transaction to such existing web page entry in the client's web page table in block 1008. However, if the referred HTML file is not an existing entry in the client's web page table, it means that the client accessed this web page without accessing the HTML file, which may be cached somewhere between the client and the web server. In this case, web page access reconstructor module 303 creates a new entry in the client's web page table for the referred HTML file and marks it as nonexistent. Web page access reconstructor module 303 then appends the considered object to the newly created web page entry in the client's web page table.

It should be recognized that the above operational blocks 1001-1009 are duplicative of the operations already performed in FIG. 8 for constructing the knowledge base 303B. Thus, in certain implementations, this part of the Web Page Session Log 303A could be constructed at the same time that the knowledge base 303B is constructed, with the remaining portion of the Web Page Session Log 303A (i.e., the portion for the entries that do not have their Referer fields set) being constructed after the knowledge base 303B is constructed. Thus, in certain implementations, the above steps 1001-1009 may be performed once to simultaneously construct the knowledge base 303B and a portion of the Web Page Session Log 303A. However, such operations have been shown in both FIGS. 8 and 10 herein for clarity.

If it is determined at block 1006 that the header field referer is not set for this transaction, then web page access reconstructor module 303 first uses knowledge base 303B to try to determine which web page accessed by this client contains the object of the transaction being considered. Thus, at operational block 1010, web page access reconstructor module 303 searches knowledge base 303B for a web page accessed by the client that contains the object of the transaction being considered. More specifically, web page access reconstructor module 303 preferably searches web pages accessed by the client starting with the latest web page (i.e., having the closest Request End timestamp to that of the transaction being considered) and progressing to the earliest accessed web page. The logic behind this search method is that the web page found in the knowledge base that contains the object of the transaction under consideration and that has a timestamp closest to that of the transaction under consideration is likely the proper web page to which the object corresponds. For instance, if the object is embedded in two different web pages contained in knowledge base 303B, the object of the transaction most likely corresponds to the web page that was accessed by the client nearest the same time as the transaction under consideration.

At block 1011 it is determined whether there is a current web page in the client web page table that contains the object of the transaction under consideration using knowledge base 303B. If such a web page is found, then the transaction is appended to such web page entry in Web Page Session Log 303A in operational block 1012. If a web page containing the object of the transaction under consideration is not found in the client web page table using knowledge base 303B, then execution progresses to block 1013.

At operational block 1013, web page access reconstructor module 303 searches the client's web page table for a web page accessed via the same Flow ID as this transaction. That is, the Flow ID field for this transaction in Transaction Log 302A is compared against the Flow IDs for entries in the client's web page table of Web Page Session Log 303A to determine whether a web page entry in the client's web page table has the same Flow ID as this transaction. At block 1014, web page access reconstructor module 303 determines whether a web page entry having the same Flow ID as this transaction is found in the client's web page table. If a web page entry in the Web Page Session Log 303A has the same Flow ID as the transaction under consideration, it is a high likelihood that the transaction under consideration corresponds to the web page entry having the same Flow ID.

To improve the results of this technique, web page access reconstructor module 303 of a preferred embodiment also adopts a configurable "think time threshold" to delimit web pages. If the time gap between the transaction and the tail of the web page to which it tries to append is larger than the think time threshold, web page access reconstructor module 303 does not append the transaction to the web page, and aliminates such transaction from further consideration. Accordingly, in block 1015, it is determined whether the time gap between the transaction and the tail of the web page that has the same Flow ID as the transaction under consideration exceeds the think time threshold. If the think time threshold is not exceeded, then the transaction is appended to the found web page entry having the same Flow ID at block 1016. That is, it is determined that this transaction is part of the web page access that has the same Flow ID. Otherwise, if it is determined at block 1015 that the think time threshold is exceeded, then such transaction is eliminated from further consideration at block 1020.

If it is determined at block 1014 that a web page having the same Flow ID as the transaction under consideration is not found in Web Page Session Log 303A, execution advances to block 1017 whereat web page access reconstructor module 303 determines the latest accessed web page in the client's web page table of Web Page Session Log 303A. That is, web page access reconstructor module 303 determines the web page in the client's web page table having the closest Request End timestamp to that of the transaction being examined. In a preferred embodiment, a think time threshold is again used in operational block 1018 to determine whether it is appropriate to append the transaction to the latest accessed web page. If the time gap between the transaction and the tail of the web page to which it tries to append is larger than the think time threshold, web page access reconstructor module 303 does not append the transaction to the web page, and drops this transaction from further consideration at operational block 1020. That is, web page access reconstructor module 303 does not utilize this entry in constructing Web Page Session Log 303A. Accordingly, in block 1018, it is determined whether the time gap between the transaction and the tail of the web page exceeds the think time threshold. If the think time threshold is not exceeded, then the transaction is appended to the latest accessed web page in the client's web page table in operational block 1019. Otherwise, web page access reconstructor module 303 drops the current transaction from further consideration in operational block 1020.

The above technique of using knowledge base 303B together with other heuristics typically provides a very accurate web page access reconstruction. However, there could be some web page accesses grouped incorrectly that may include the objects that in reality do not belong to the web page to which they have been associated. However, certain methods may be employed to further improve the results of this approach (i.e., to reduce the percentage of incorrectly reconstructed web page accesses). In a preferred embodiment, statistical analysis of observed web page access patterns is utilized to more exactly determine the content of the web pages accessed, which helps to improve the results of reconstructed web page accesses. For instance, the content of web pages may be determined, which may aid in determining whether the appropriate transactions are correctly grouped together for reconstructing a web page access.

Figure 11:
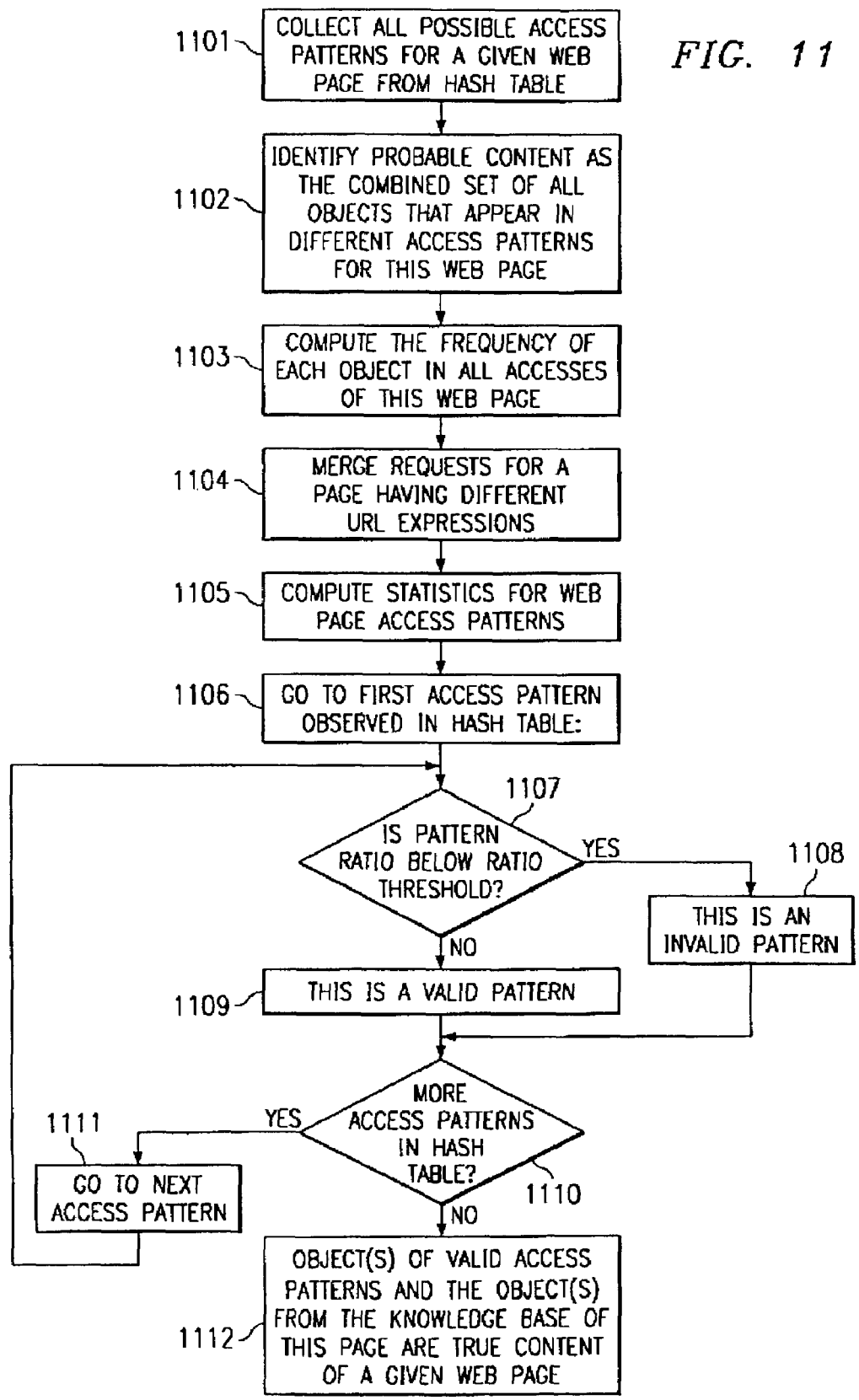
FIG. 11 shows an example operational flow diagram for determining the content of a web page in accordance with a preferred embodiment of the present invention.

Accordingly, once the hash table of web page accesses (or "Web Page Session Log 303A") is generated from the operational flow of FIG. 10, web page access reconstructor module 303 of a preferred embodiment utilizes such hash table to attempt to determine the content of any given web page in the manner described hereafter in conjunction with the example operational flow diagram of FIG. 11. As shown in FIG. 11, web page access reconstructor module 303 first collects all possible access patterns for a given web page from the hash table (or Web Page Session Log 303A) in operational block 1101. In operational block 1102, web page access reconstructor module identifies the probable content of a web page as being the combined set of all objects that appear in different access patterns for such web page.

Thus, web page access reconstructor module 303 scans the web page hash table of Web Page Session Log 303A and creates a new hash table mapping of URLs to the objects embedded in the URLs. Table 2 below provides an example hash table mapping of URLs to the objects embedded in the URLs for a particular web page identified in Web Page Session Log 303A.

TABLE 2

Web page Probable Content table (there are 3075 accesses for this page).

| Index | URL | Frequency | Ratio (%) |
|---|---|---|---|
| 1 | /index.html | 2937 | 95.51 |
| 2 | /img1.gif | 689 | 22.41 |
| 3 | /img2.gif | 641 | 20.85 |
| 4 | /log1.gif | 1 | 0.03 |
| 5 | /log2.gif | 1 | 0.03 |

In creating the new hash table mapping, such as the example of Table 2, web page access reconstructor module 303 assigns an index for each object that appears in the access patterns for a web page. The column URL of Table 2 identifies the URLs of the objects that appear in the access patterns for the web page. In operational block 1103, web page access reconstructor module 303 computes the frequency at which each object occurs in all accesses of the web page being considered. That is, web page access reconstructor module 303 maintains a count for each object grouped for the web page under consideration in the access patterns. The column Frequency of Table 2 identifies the frequency of an object in the set of all web page accesses in the hash table.

Table 2 above shows an example of a new hash table built as a probable content of a given web page identified from the web page accesses. In Table 2 the indices are sorted by the frequencies of the occurrences of the objects. The column Ratio is the percentage of the object's accesses in the total accesses for the page. Before computing the statistics of the access patterns for web pages, web page access reconstructor module 303 of a preferred embodiment also attempts, in operational block 1104, to merge the requests for the same page with different URL expressions. For example, the following URLs could point to the same web page:

(a) http://www.hpl.hp.com (b) http://www.hpl.hp.com/

(c) http://www.hpl.hp.com/index.htm (d) http://www.hpl.hp.com/index.html.

In a preferred embodiment, web page access reconstructor module 303 merges the accesses for URLs that point to the same web page. Web page access reconstructor module 303 may use the probable content of these URLs to determine whether they indicate the same web page. As discussed in the following paragraph, the heuristic method for grouping objects into web page accesses may cause some objects to be grouped by mistake. So, even if two URLs are for the same web page, their probable content may include different objects. However, the proportion of the accesses to these objects should be relatively small, (e.g., below a certain threshold, such as 1%), and therefore the web page access reconstructor 303 may ignore them when merging URLs.

The heuristic methods used by web page access reconstructor module 303 for grouping transactions into web page accesses may introduce some inaccuracy, and some access patterns collected by web page access reconstructor module 303 may include objects that in reality do not belong to the web page. To adjust/improve the grouping results of web page access reconstructor module 303, statistics are used in a preferred embodiment to more precisely determine the content of web pages from the page access patterns. More specifically, based on a web page's probable content table, as demonstrated in Table 2 web page access reconstructor module 303 uses the indices of objects in Table 2 to describe the access patterns for a given web page.

Table 3 below provides an example set of different combinations of observed access patterns for the web page considered in the example of Table 2. Each row of Table 3 is an access pattern. The column Object Indices shows the indices of the objects accessed in a pattern. In operational block 1105, web page access reconstructor module 303 computes statistics for the various observed access patterns for a web page, such as the Frequency and Ratio statistics of Table 3. The columns Frequency and Ratio are the number of accesses and the percentage of a pattern in the total number of all accesses for the web page. For example, pattern 1 is a pattern in which only the object /index.html is accessed. It is the most popular access pattern for this web page. In the example of Table 3, 2,271 accesses out of the total 3,075 accesses represent this pattern. In pattern 2, the objects /index.html, /img1.gif and /img2.gif are accessed.

TABLE 3

Web page access patterns (with a total of 3,075 accesses)

| Index | Object Indices | Frequency | Ratio (%) |
|---|---|---|---|
| 1 | 1 | 2271 | 73.85 |
| 2 | 1, 2, 3 | 475 | 15.45 |
| 3 | 1, 2 | 113 | 3.67 |
| 4 | 1, 3 | 76 | 2.47 |
| 5 | 2, 3 | 51 | 1.66 |
| 6 | 2 | 49 | 1.59 |
| 7 | 3 | 38 | 1.24 |
| 8 | 1, 2, 4 | 1 | 0.03 |
| 9 | 1, 3, 5 | 1 | 0.03 |

For any given web page, web page access reconstructor module 303 of a preferred embodiment attempts to further estimate the web page's true content with the help of the statistics for the web page access patterns. Intuitively, if an access pattern is collected by web page constructor module 303 by mistake, it is unlikely for this pattern to appear many times. For Example, patterns 8 and 9 in the example of Table 3 each occur only once. This might be caused by a proxy that accessed the objects consecutively in a very short time period, and the Via field in the request header was not set up, for example. Another reason for this mistake can be that web page access reconstructor module 303 may attach the objects that do not have a referer field to a wrong web page if these objects were accessed in a reasonably short time after this web page (as described in the example flow diagram of FIG. 10).

In a preferred embodiment, web page access reconstructor module 303 uses a configurable ratio threshold to exclude the mistaken patterns, e.g., a ratio threshold of 1%. If the ratio of a pattern is below the threshold, web page access reconstructor module 303 does not consider it as a valid pattern. In practice, the threshold can be adjusted according to the number of accesses for the web page. For instance, if the number of accesses is small, a large threshold is preferably adopted since the mistaken patterns occupy a much larger ratio in this case. So, patterns 8 and 9 in the example of Table 3 are not considered as valid access patterns.

Accordingly, in operational block 1106 of FIG. 9, attention is directed to the first access pattern observed in the hash table for the web page under consideration. A determination is made at block 1107 whether the pattern's ratio is below a predefined ratio threshold. If it is determined that the pattern's ratio is below the threshold, then it is determined, at block 1108, that this is an invalid pattern. Otherwise, it is determined, at block 1109, that the pattern under consideration is valid. At block 1110 it is determined whether more access patterns for the web page under consideration exist in the hash table. If it is determined that more such access patterns do exist, then attention is directed to the next access pattern for the web page at block 1111, and execution then returns to block 1107 to determine whether this next access pattern is valid.

Once it is determined at block 1110 that no further access patterns exist in the hash table for the web page under consideration, execution advances to block 1112 whereat the object(s) of valid access patterns are determined to be the true content of the web page under consideration. That is, only the objects found in the valid access patterns and a knowledge base of the page are considered as being the true embedded objects of a given web page. Thus, objects having indices 1, 2, and 3 in the above example of Table 3 are determined to define the true content of the web page under consideration, as shown in Table 4 below.

TABLE 4

Web page's true content (with a total of 3075 accesses)

| Index | URL | Frequency | Ratio (%) |
|---|---|---|---|
| 1 | /index.html | 2937 | 95.51 |
| 2 | /img1.gif | 689 | 22.41 |
| 3 | /img2.gif | 641 | 20.85 |

Finally, a web page access from Web Page Session Log 303A is considered to be valid if all the objects from the page's accesses are contained in the true content for a given web page. Accordingly, the reconstructed web page accesses of Web Page Session Log 303A that are determined to be valid are considered to be reliable/accurate. Thus, the valid reconstructed web page accesses provide great accuracy in representing client web page accesses, which may be used, for example, in evaluating client-perceived end-to-end performance in certain embodiments. In a preferred embodiment, the end-to-end response time statistics may be computed using the web page accesses from Web Page Session Log 303A that are determined to be valid.

The first typical metrics of interest for service providers is the average end-to-end time observed by the clients when downloading a given page during a particular time interval. A more advanced analysis of the end-to-end time includes computation of the whole distribution of end-to-end times observed by clients when downloading a given page during a particular time interval. Such distribution allows, for example, the following to be computed: A) a percentage of clients with a "good site experience" (i.e. their observed response time was below a predefined targeted threshold), and B) a percentage of clients with a "poor site experience" (i.e. their observed response time was above the targeted threshold).

In a preferred embodiment, such performance metrics may be computed for a given web page. For example, the web page hash table may be scanned, and the end-to-end response time may be computed for entries in the table whose objects are in the subset of the true content of a the web page under consideration. The end-to-end response time for a given web page access is defined as a difference between the earliest and latest timestamps among the page related objects in the corresponding web page hash table entry. Various other performance metrics may be computed for the valid reconstructed web page accesses to provide the service provider with an understanding of the client-perceived performance of the services (e.g., web page accesses).

Figure 12:
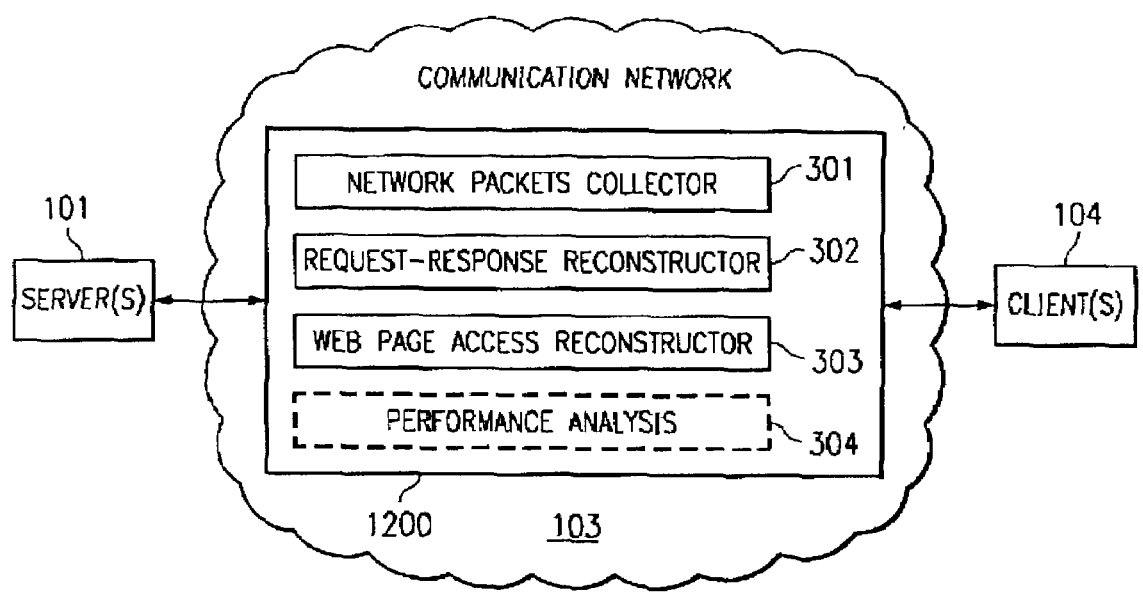
FIG. 12 shows an example of a solution for reconstructing web page accesses that is deployed as a network appliance.

It should be understood that the modules of FIG. 3 for reconstructing web page accesses may be deployed in several different ways on the server side of a client-server network. As used herein, the "server side" of a client-server network is not intended to be limited solely to the server itself, but is also intended to comprise any point in the client-server network at which all of the traffic "to" and "from" the server (e.g., a web server cluster or a particular web server in a cluster) that is used to support the monitored web site (or other type of monitored information that is accessible by a client) can be observed (e.g., to enable capture of the network packets communicated to/from the server). Various examples of server-side implementations are described herein below. As one example, the modules may be implemented as an independent network appliance for reconstructing web page accesses (and, in certain implementations, measuring end-to-end performance). An example of such a network appliance implementation is shown in FIG. 12. As shown, one or more servers 101 (e.g., servers 101A-101D of FIG. 1) may be provided for serving information (e.g., web pages) to one or more clients 104 (e.g., clients 104A-104D of FIG. 1) via communication network 103. Web page access reconstructor appliance 1200 may be arranged at a point in communication network 103 where it can capture all HTTP transactions for server(s) 101, e.g., the same subnet of server(s) 101. In this implementation, web page access reconstructor appliance 1200 should be arranged at a point in network 103 where traffic in both directions can be captured for server(s) 101: the request traffic to server(s) 101, and the response traffic from server(s) 101. Thus, if a web site consists of multiple web servers 101, web page access reconstructor appliance 1200 should be placed at a common entrance and exit of all such web servers 101.

If a web site is supported by geographically distributed web servers, such a common point may not exist in network 103. However, most typically, web servers in a web server farm (or cluster) use "sticky connections", i.e., once the client, has established a TCP connection with a particular web server, the consequent client's requests are sent to the same server. In this case, implementing web page access reconstructor appliance 1200 can still be used to capture a flow of transactions (to and from) a particular web server 101, representing a part of all web transactions for the web site, and the measured data can be considered as sampling.

Figure 13:
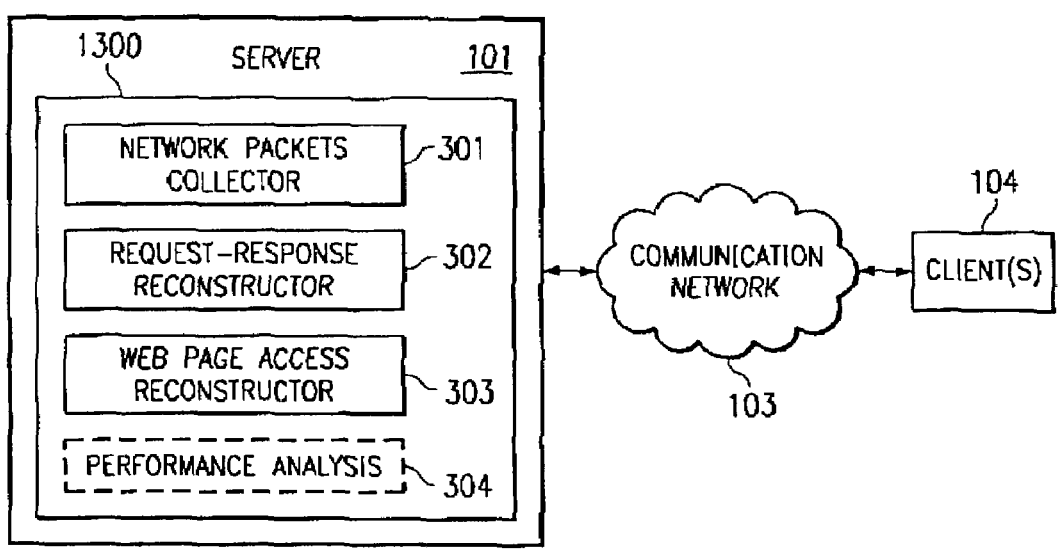
FIG. 13 shows an example of a solution for reconstructing web page accesses that is deployed as software on a web server.

As another example of how the modules of FIG. 3 may be deployed, they may be implemented as a software solution deployed on a web server. An example of such a software solution is shown in FIG. 13. As shown, server 101 may be provided for serving information (e.g., web pages) to one or more clients 104 via communication network 103. Web page access reconstructor software 1300 may be implemented as a software solution at server 101, and used for reconstructing transactions (and, in certain implementations, measuring end-to-end performance) at this particular server.

If a web site consists of multiple web servers, then as in the previous case, this software solution still can work when each web server is using "sticky connections". In this case, the software solution 1300 can be installed at a randomly selected web server 101 in the overall site configuration, and the measured data can be considered as sampling.

Figure 14:
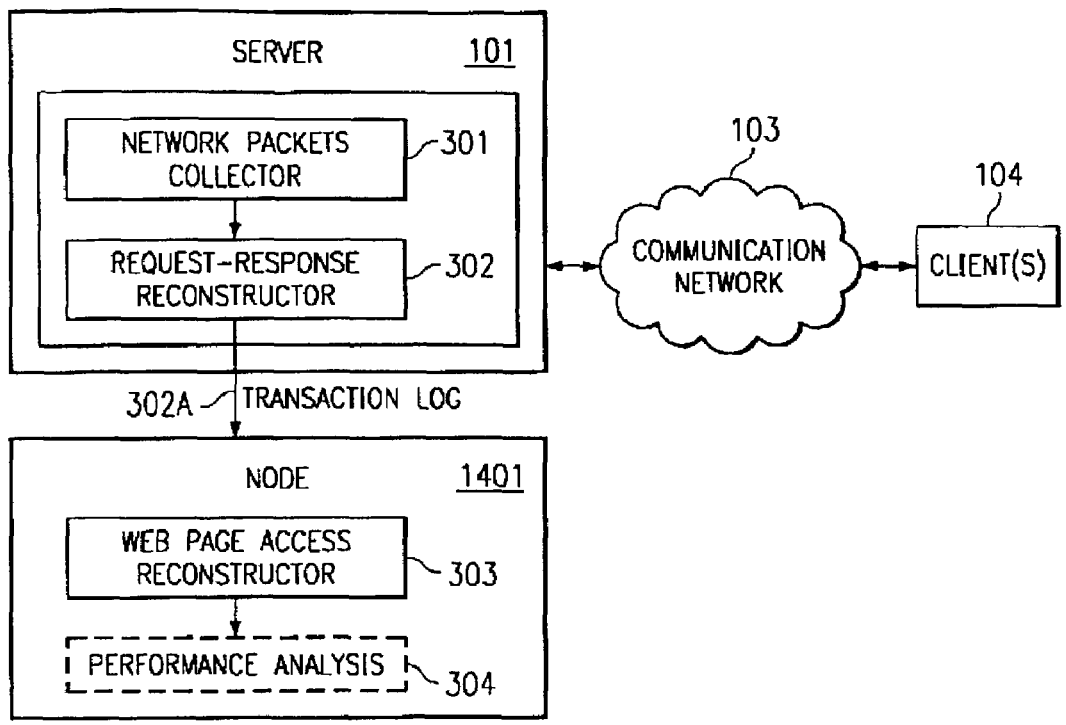
FIG. 14 shows an example of a solution for reconstructing web page accesses in which a portion of the solution is deployed as software on a web server and a portion of the solution is deployed as software on an independent node.

As another example of how the modules of FIG. 3 may be deployed, they may be implemented as a mixed software solution with some modules deployed on a web server and some modules deployed on an independent node, outside of a web server complex. An example of such a mixed software solution is shown in FIG. 14. As shown, server 101 may be provided for serving information (e.g., web pages) to one or more clients 104 via communication network 103. A portion of the web page access reconstructor solution (e.g., certain modules) may be implemented at server 101, and the rest (e.g., the remaining modules) may be implemented at an independent node.

For example, to minimize the performance impact of additional computations on server 101, only two modules are deployed at server 101 in the example of FIG. 14, i.e., network packets collector module 301 and request-response reconstructor module 302. The outcome of request-response reconstructor module 302 is a Transaction Log 302A that is preferably two orders of magnitude smaller than the original Network Trace 301A. Such Transaction Log 302A is transferred to a different, independent node 1401 installed with web page access reconstructor module 303 and, in some implementations, performance analysis module 304. These modules process the Transaction Logs received from web server(s) 101 to reconstruct web page accesses and, in certain implementations, generate performance analysis (e.g., end-to-end performance measurements).

It should be noted that in each of the implementations described above in FIGS. 12-14, the solutions exclude from consideration the encrypted connections whose content cannot be analyzed, and hence, the HTTP level information cannot be extracted. That is, because embodiments of the present invention capture network-level information and utilize such network-level information for reconstructing web page accesses, encrypted connections are not analyzed.

When implemented via computer-executable instructions, various elements of the present invention, such as modules 301-304 of FIG. 3, are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 15:
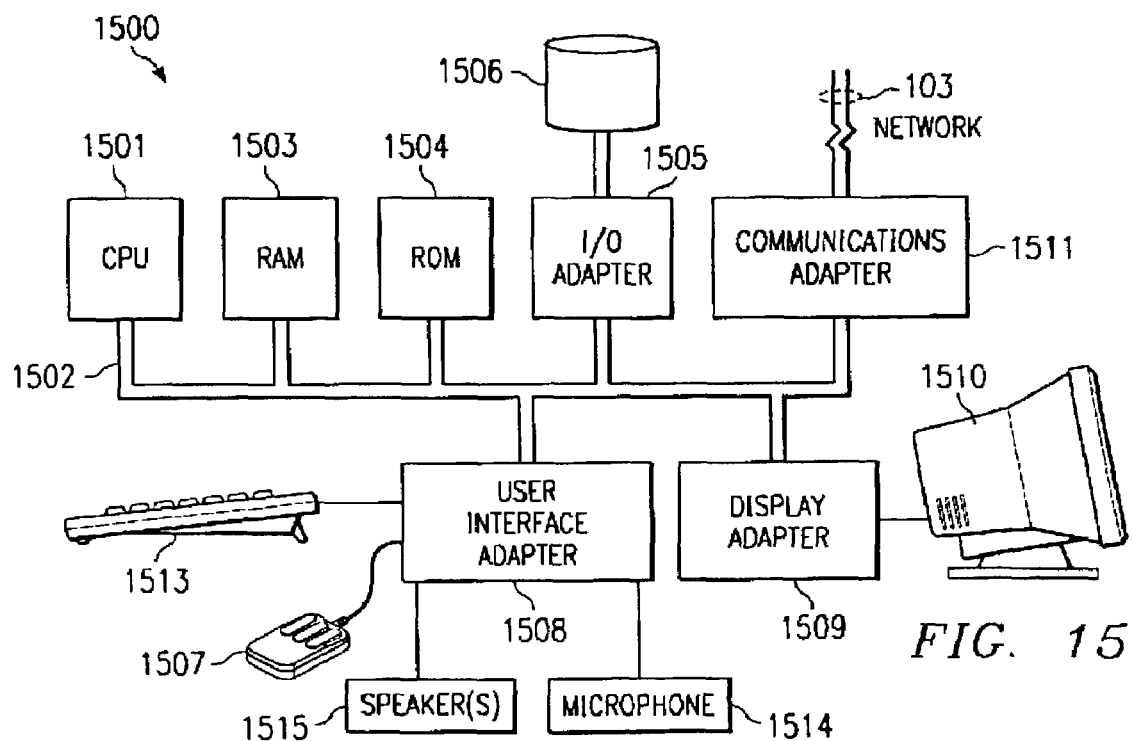
FIG. 15 shows an example computer system on which embodiments of the present invention may be implemented.

FIG. 15 illustrates an example computer system 1500 adapted according to embodiments of the present invention. Central processing unit (CPU) 1501 is coupled to system bus 1502. CPU 1501 may be any general purpose CPU. Suitable processors include without limitation INTEL's PENTIUM® 4 processor, for example. However, the present invention is not restricted by the architecture of CPU 1501 as long as CPU 1501 supports the inventive operations as described herein. CPU 1501 may execute the various logical instructions according to embodiments of the present invention. For example, CPU 1501 may execute machine-level instructions according to the exemplary operational flows described above in conjunction with FIGS. 4, 6, 8, 10, and 11.

Computer system 1500 also preferably includes random access memory (RAM) 1503, which may be SRAM, DRAM, SDRAM, or the like. Computer system 1500 may utilize RAM 1503 to store the Network Trace 301A, Transaction Log 302A, and/or Web Page Session Log 303A, as examples. Computer system 1500 preferably includes read-only memory (ROM) 1504 which may be PROM, EPROM, EEPROM, or the like. RAM 1503 and ROM 1504 hold user and system data and programs as is well known in the art.

Computer system 1500 also preferably includes input/output (I/O) adapter 1505, communications adapter 1511, user interface adapter 1508, and display adapter 1509. I/O adapter 1505 and/or user interface adapter 1508 may, in certain embodiments, enable a user to interact with computer system 1500 in order to input information (e.g., for specifying configurable variables, such as the configurable think time threshold described with FIG. 10).

I/O adapter 1505 preferably connects to storage device(s) 1506, such as one or more of hard drive, compact disc (CD) drive, floppy disk drive, tape drive, etc. to computer system 1500. The storage devices may be utilized when RAM 1503 is insufficient for the memory requirements associated with storing data for reconstructing web page accesses. Communications adapter 1511 is preferably adapted to couple computer system 1500 to network 103. User interface adapter 1508 couples user input devices, such as keyboard 1513, pointing device 1507, and microphone 1514 and/or output devices, such as speaker(s) 1515 to computer system 1500. Display adapter 1509 is driven by CPU 1501 to control the display on display device 1510.

It shall be appreciated that the present invention is not limited to the architecture of system 1500. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

While various examples are described herein for reconstructing web page accesses from captured network packets, it should be understood that the present invention is not so limited. Rather, certain embodiments of the present invention may applied to reconstruct other types of client accesses of a server in a client-server network through captured network packets. For example, a client may access information from one or more clients in a client-server network, and embodiments of the present invention may be implemented to utilize captured network packets for such information access to reconstruct the client access in order, for example, to measure the client-perceived end-to-end performance in receiving the information from the server(s). Particularly if the information being accessed is retrieved by the client from the server through a plurality of transactions, embodiments of the present invention may be utilized to group the corresponding transactions together for their respective client accesses of the information.

What is claimed is:

1. A method for reconstructing client web page accesses, said method comprising:
    capturing network-level information for client accesses of at least one web page;
    constructing a knowledge base of reliable information identifying content of at least one web page; and
    reconstructing at least one client web page access from said captured network-level information using said reliable information of said knowledge base.

2. The method of claim 1 wherein said constructing a knowledge base comprises:
    identifying at least one transaction for which the captured network-level information comprises information directly identifying its corresponding web page; and
    associating the content of said at least one identified transaction to its corresponding web page.

3. The method of claim 1 wherein said constructing a knowledge base comprises:
    using the captured network-level information to construct said knowledge base.

4. The method of claim 1 wherein said reconstructing at least one client web page access comprises:
    relating transactions between a client and a server to their corresponding web page access.

5. The method of claim 1 wherein said reconstructing at least one client web page access further comprises:
    identifying transactions for said client accesses from the captured network-level information; and
    relating said transactions to their corresponding web page access.

6. The method of claim 1 wherein said network-level information comprises network packets.

7. The method of claim 1 wherein said capturing network-level information comprises:
    using a network-level information capture tool for capturing said network-level information, said network-level information capture tool comprising one selected from the group consisting of tcpdump and WinDump.

8. The method of claim 1 further comprising:
    performing said capturing network-level information on a server-side of a communication network used by a client to access said at least one web page.

9. The method of claim 1 wherein said capturing network-level information comprises:
    capturing said network-level information for a plurality of transactions.

10. The method of claim 9 wherein each of said plurality of transactions comprises a request from a client to a server and a response to said client from said server.

11. The method of claim 9 wherein said reconstructing at least one client web page access comprises:
    determining a respective web page access to which each of said plurality of transactions corresponds.

12. The method of claim 9 wherein said reconstructing at least one client web page access comprises at least one selected from the group consisting of:
    using content information included in said captured network-level information for a transaction that identifies the type of content of the transaction to determine a client web page access to which the transaction corresponds, using information in said knowledge base to identify a web page to which the content of the transaction corresponds to determine a client web page access to which the transaction corresponds, and using information included in said captured network-level information for a transaction that directly identifies a web page to which the content of the transaction corresponds to determine a client web page access to which the transaction corresponds.

13. The method of claim 1 wherein said reconstructing at least one client web page access comprises:
    if, from the captured network-level information for a given transaction between a client and a server, a particular web page can be determined to which content of the given transaction corresponds, then relating the given transaction to a client access of said particular web page; and
    if the particular web page to which content of the given transaction corresponds cannot be determined from the captured network-level information for the given transaction, then determining whether the knowledge base comprises information identifying the particular web page to which content of the given transaction corresponds.

14. A method for constructing a knowledge base of information about the content of web pages accessed by clients, said method comprising:
    capturing network-level information for client accesses of at least one web page;
    identifying transactions for said client accesses from the captured network-level information;
    determining at least one of said transactions that includes information directly identifying the web page to which said at least one transaction relates; and
    constructing a knowledge base of information about the content of said at least one web page using at least said at least one transaction determined to include information directly identifying the web page to which it relates.

15. The method of claim 14 wherein said knowledge base comprises information associating the content of said at least one transaction that includes information directly identifying the web page to which it relates to its corresponding web page.

16. The method of claim 14 wherein said information directly identifying the web page to which said at least one transaction relates comprises:
the captured network-level information for said at least one transaction.

17. The method of claim 14 wherein said network-level information comprises network packets.

18. The method of claim 14 further comprising:
performing said capturing network-level information on a server-side of a communication network used by a client to access said at least one web page.

19. The method of claim 14 wherein said capturing network-level information comprises:
capturing said network-level information for a plurality of transactions.

20. The method of claim 19 wherein each of said plurality of transactions comprises a request from a client to a server and a response to said client from said server.

21. The method of claim 14 wherein said constructing a knowledge base of information further comprises:
using the content type of a given transaction to determine the web page to which the content of the given transaction corresponds.

22. A system for reconstructing client web page accesses, said system comprising:
means for capturing network-level information for a plurality of transactions for client accesses of at least one web page;
means for constructing a knowledge base of reliable information identifying content of at least one web page; and
means for reconstructing at least one client web page access by relating said plurality of transactions to their corresponding web page accesses.

23. The system of claim 22 wherein said means for constructing a knowledge base comprises:
means for identifying at least one of said plurality of transactions for which the captured network-level information comprises information directly identifying its corresponding web page.

24. The system of claim 22 wherein said means for constructing a knowledge base uses the captured network-level information to construct said knowledge base.

25. The system of claim 22 wherein said network-level information comprises network packets.

26. The system of claim 22 wherein said means for capturing network-level information is arranged on a server-side of a communication network used by a client to access said at least one web page.

27. The system of claim 22 wherein each of said plurality of transactions comprises a request from a client to a server and a response to said client from said server.

28. A method for reconstructing client information accesses, said method comprising:
capturing network-level information for client accesses of server information from a server, wherein each client access of said server information comprises a plurality of transactions;
using the captured network-level information for at least one of said plurality of transactions for constructing a knowledge base of reliable information identifying content of said server information; and
using said knowledge base for relating said plurality of transactions to their corresponding client access of said server information.

29. The method of claim 28 wherein said network-level information comprises network packets captured from a packet-switched communication network communicatively coupling a client and said server.

30. The method of claim 28 wherein each of said plurality of transactions comprises a request from a client to said server and a response from said server to said client.

31. The method of claim 28 wherein said relating said plurality of transactions to their corresponding client access of said server information comprises:
evaluating the captured network-level information for each of said plurality of transactions to determine the corresponding client access to which the transaction corresponds.

32. The method of claim 28 wherein said server information comprises a web page.

33. The method of claim 28 wherein said capturing network-level information is performed on a server-side of a client-server network.

34. The method of claim 28 wherein said constructing a knowledge base comprises:
determining at least one of said plurality of transactions that includes network-level information directly identifying the server information to which said at least one transaction relates; and
constructing a knowledge base about the content of said server information using said at least one transaction determined to include network-level information directly identifying the server information to which it relates.

* * * * *

UNITED STATES PATENT AND TRADEMARK OFFICE
CERTIFICATE OF CORRECTION

PATENT NO. : 7,246,101 B2 Page 1 of 1
APPLICATION NO. : 10/147619
DATED : July 17, 2007
INVENTOR(S) : Yun Fu et al.

It is certified that error appears in the above-identified patent and that said Letters Patent is hereby corrected as shown below:

In column 1, line 54, after "performance" insert -- perceived by clients is a major --.

In column 8, line 1, delete "as $_1$ Object" and insert -- as Object$_1$ --, therefor.

In column 23, line 47, delete "URL$_4$" and insert -- URL$_n$ --, therefor.

In column 29, line 20, delete "constructor" and insert -- access reconstructor --, therefor.

Signed and Sealed this

Thirteenth Day of January, 2009

JON W. DUDAS
*Director of the United States Patent and Trademark Office*